US010101739B2

(12) United States Patent
Clarke et al.

(10) Patent No.: US 10,101,739 B2
(45) Date of Patent: Oct. 16, 2018

(54) MULTI-BODY SELF PROPELLED DEVICE WITH INDUCTION INTERFACE POWER TRANSFER

(71) Applicant: Sphero, Inc., Boulder, CO (US)

(72) Inventors: David Clarke, Boulder, CO (US); Prashant Luitel, Boulder, CO (US)

(73) Assignee: SPHERO, INC., Boulder, CO (US)

( * ) Notice: Subject to any disclaimer, the term of this patent is extended or adjusted under 35 U.S.C. 154(b) by 31 days.

(21) Appl. No.: 15/156,707

(22) Filed: May 17, 2016

(65) Prior Publication Data

US 2017/0269589 A1   Sep. 21, 2017

Related U.S. Application Data

(60) Provisional application No. 62/311,383, filed on Mar. 21, 2016.

(51) Int. Cl.
| | | |
|---|---|---|
| *G05D 1/00* | (2006.01) | |
| *G05D 1/02* | (2006.01) | |
| *B60L 11/18* | (2006.01) | |
| *B62D 57/00* | (2006.01) | |

(52) U.S. Cl.
CPC .......... *G05D 1/0022* (2013.01); *B60L 11/182* (2013.01); *B60L 11/1818* (2013.01); *B62D 57/00* (2013.01); *G05D 1/0038* (2013.01); *G05D 1/0225* (2013.01)

(58) Field of Classification Search
CPC ...... G05D 1/0022; H02J 5/005; H01F 27/255; H05B 41/02

USPC ................... 180/167; 315/248; 320/108; 1/1
See application file for complete search history.

(56) References Cited

U.S. PATENT DOCUMENTS

| | | | |
|---|---|---|---|
| 933,623 | A | 3/1909 | Cecil |
| 1,763,903 | A | 6/1930 | Perkins |
| 2,104,636 | A | 1/1938 | Russell |
| 2,323,837 | A | 7/1943 | Neal |
| 2,801,496 | A | 8/1957 | Borsos |
| 3,798,835 | A | 3/1974 | McKeehan |
| 4,471,565 | A | 9/1984 | Terzian |

(Continued)

OTHER PUBLICATIONS

U.S. Appl. No. 15/156,737, Office Action dated Jun. 28, 2017, 16 pages.

(Continued)

*Primary Examiner* — Anne M Antonucci
*Assistant Examiner* — Sanjeev Malhotra

(57) ABSTRACT

A multi-body self-propelled device can include a drive body and a coupled head. The drive body can include a spherical housing, an internal drive system within the spherical housing to propel the multi-body self-propelled device, and a magnet holder coupled to the internal drive system to hold a first set of magnetic elements. The drive body can further include a first power source within the spherical housing to power the internal drive system and a first inductive interface. The coupled head can include second set of magnetic elements to establish a magnetic interaction with the first set of magnetic elements through the spherical housing. The coupled head can also include a second power source, and a second inductive interface. The multi-body self-propelled device can transfer power between the coupled head and the drive body via the first and the second inductive interfaces.

15 Claims, 17 Drawing Sheets

(56) References Cited

U.S. PATENT DOCUMENTS

| | | |
|---|---|---|
| 4,501,569 A | 2/1985 | Clark |
| 4,541,814 A | 9/1985 | Martin |
| 4,601,675 A | 7/1986 | Robinson |
| 4,822,044 A | 4/1989 | Perkitny |
| 5,435,086 A | 7/1995 | Huang |
| 5,439,408 A | 8/1995 | Wilkinson |
| 5,620,353 A | 4/1997 | Lai |
| 5,676,582 A | 10/1997 | Lin |
| 5,713,776 A | 2/1998 | Hou |
| 5,743,780 A | 4/1998 | Liu |
| 5,871,386 A | 2/1999 | Bat |
| 5,893,789 A | 4/1999 | Wu |
| 5,893,791 A | 4/1999 | Wilkinson |
| 6,132,284 A | 10/2000 | Lin |
| 6,238,262 B1 | 5/2001 | Pracas |
| 6,414,457 B1 | 7/2002 | Agrawal |
| 6,508,022 B2 | 1/2003 | Huang |
| 6,523,287 B1 | 2/2003 | Lee |
| 7,235,013 B2 | 6/2007 | Kobayashi |
| 7,258,591 B2 | 8/2007 | Xu |
| 7,348,754 B2 | 3/2008 | Prasanna |
| 7,868,721 B2 | 1/2011 | Fullerton |
| 8,269,447 B2 | 9/2012 | Smooth |
| 8,571,781 B2 | 10/2013 | Bernstein et al. |
| 9,011,197 B2 | 4/2015 | Smoot |
| 9,022,593 B2 | 5/2015 | Yang |
| 9,090,214 B2 | 7/2015 | Bernstein et al. |
| 9,211,920 B1 | 12/2015 | Bernstein et al. |
| 9,429,940 B2 | 8/2016 | Bernstein et al. |
| 9,457,730 B2 | 10/2016 | Bernstein et al. |
| 9,481,410 B2 | 11/2016 | Bernstein et al. |
| 2003/0045203 A1 | 3/2003 | Sabe et al. |
| 2003/0057877 A1* | 3/2003 | Kurachi ............ H05B 41/02 315/248 |
| 2004/0182614 A1 | 9/2004 | Wakui |
| 2010/0032224 A1 | 2/2010 | Liu |
| 2012/0074899 A1* | 3/2012 | Tsai ............ H02J 5/005 320/108 |
| 2012/0168241 A1 | 7/2012 | Bernstein et al. |
| 2014/0062996 A1 | 3/2014 | Kopychev |
| 2014/0238762 A1 | 8/2014 | Berberian |
| 2014/0268668 A1 | 9/2014 | Yang |
| 2014/0321022 A1 | 10/2014 | Mori |
| 2014/0345957 A1 | 11/2014 | Berstein et al. |
| 2015/0224941 A1* | 8/2015 | Bernstein ............ G05D 1/0022 180/167 |
| 2015/0258435 A1 | 9/2015 | Zhang |
| 2016/0101741 A1 | 4/2016 | Bernstein et al. |
| 2016/0349748 A1 | 12/2016 | Bernstein et al. |
| 2017/0256353 A1* | 9/2017 | Park ............ H01F 27/255 |
| 2017/0266576 A1 | 9/2017 | Clarke |
| 2017/0266577 A1 | 9/2017 | Clarke |

OTHER PUBLICATIONS

PCT International Search Report in PCT/US2017/023188, dated Jun. 26, 2017, 16 pages.

U.S. Appl. No. 15/156,939, Office Action dated Aug. 7, 2017, 8 pages.

U.S. Appl. No. 15/156,737, Amendment and Response filed Sep. 20, 2017, 11 pages.

U.S. Appl. No. 15/156,737, Office Action dated Dec. 12, 2017, 16 pages.

U.S. Appl. No. 15/156,939, Notice of Allowance dated Jan. 8, 2018, 10 pages.

U.S. Appl. No. 15/156,737, Amendment and Response filed Feb. 5, 2018, 9 pages.

U.S. Appl. No. 15/156,737, Advisory Action dated Feb. 14, 2018, 2 pages.

U.S. Appl. No. 15/156,737, Office Action dated Apr. 6, 2018, 15 pages.

* cited by examiner

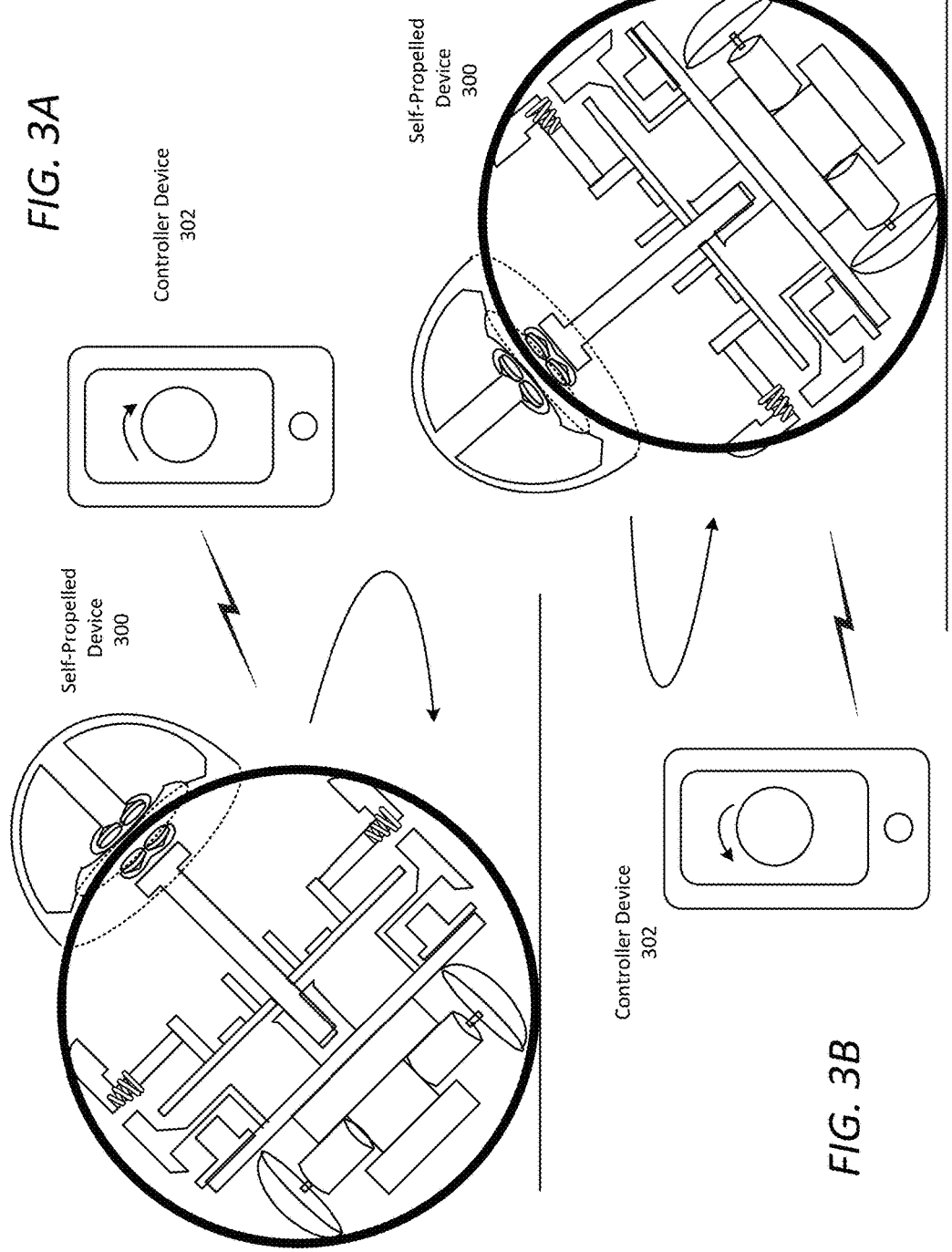

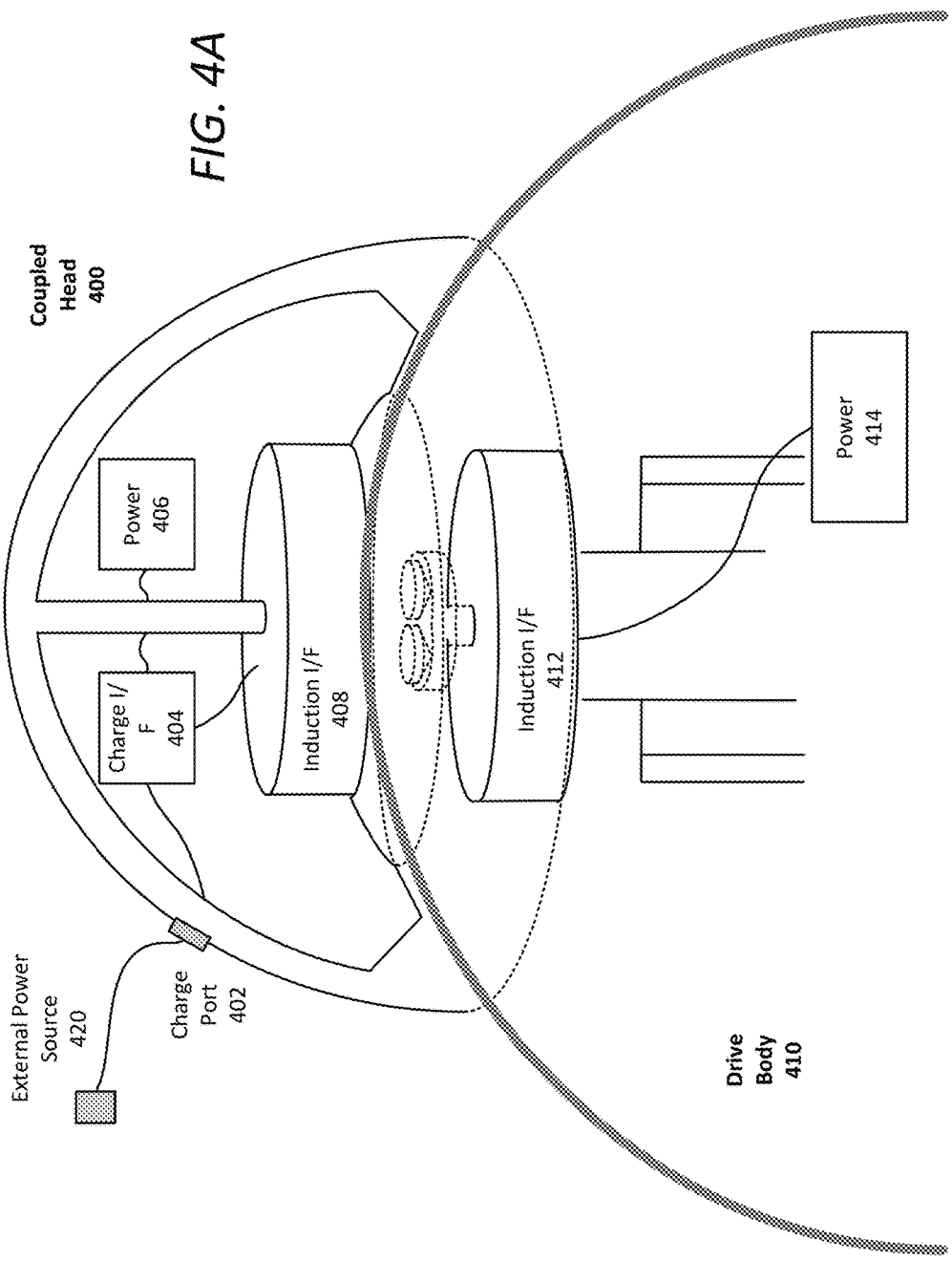

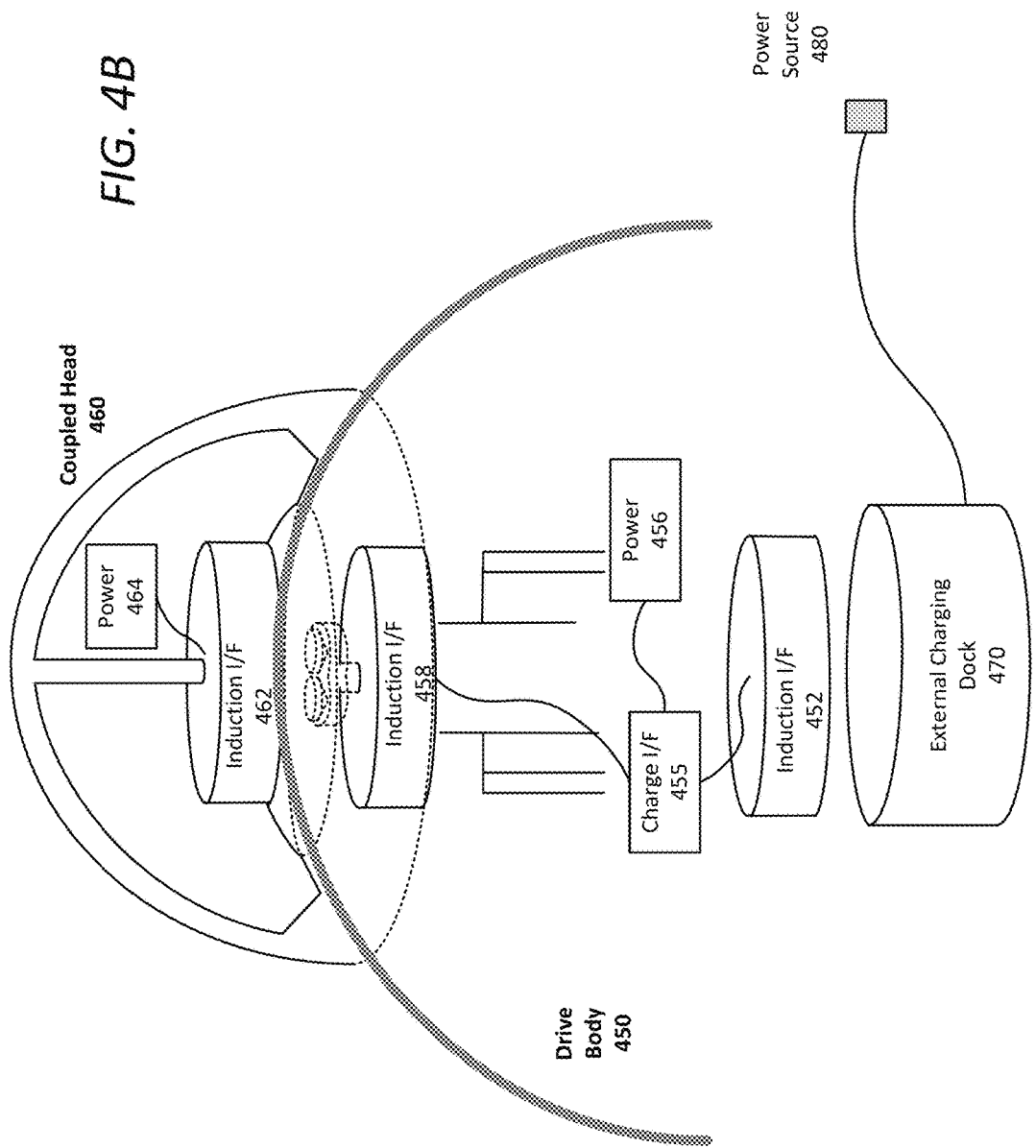

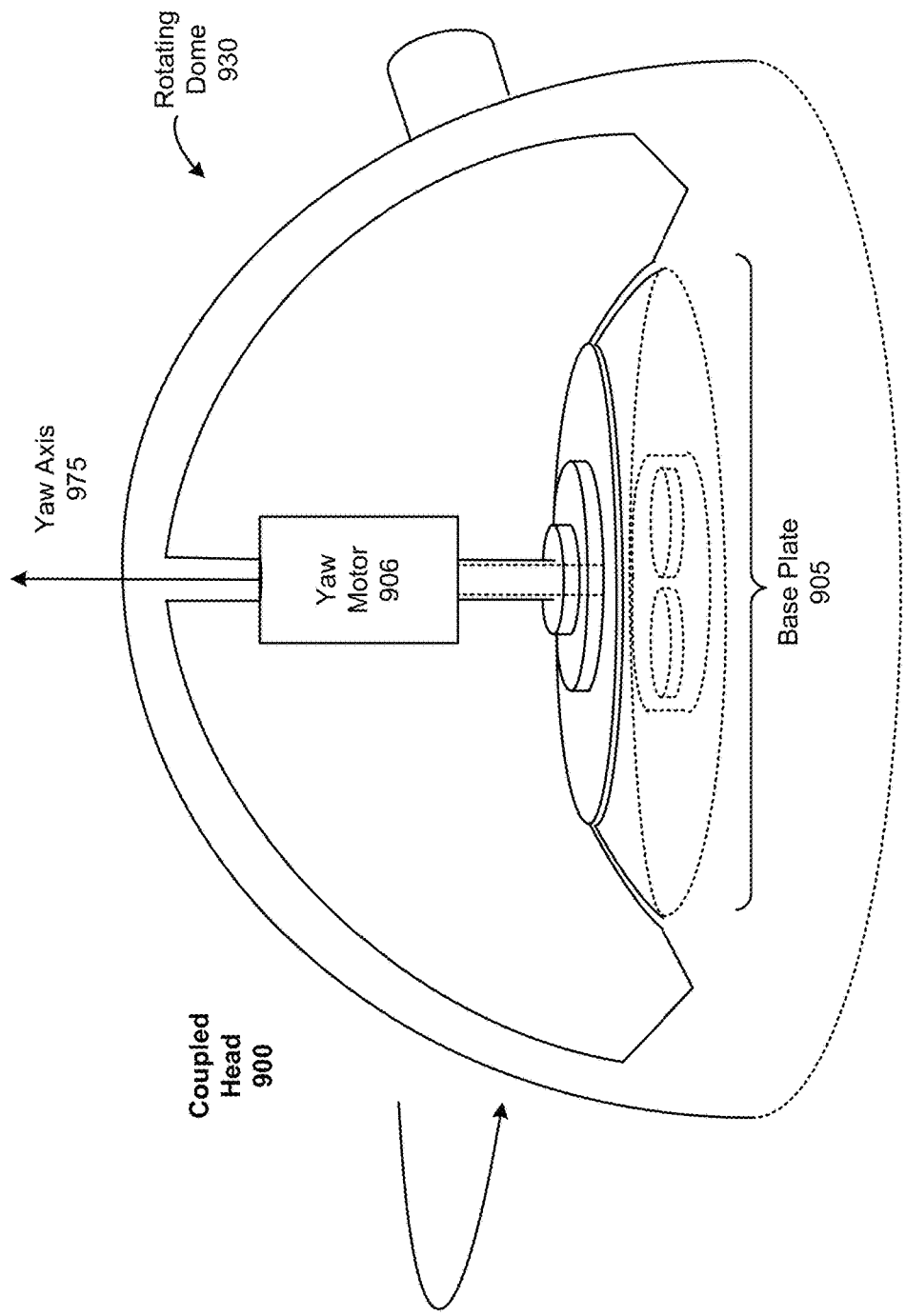

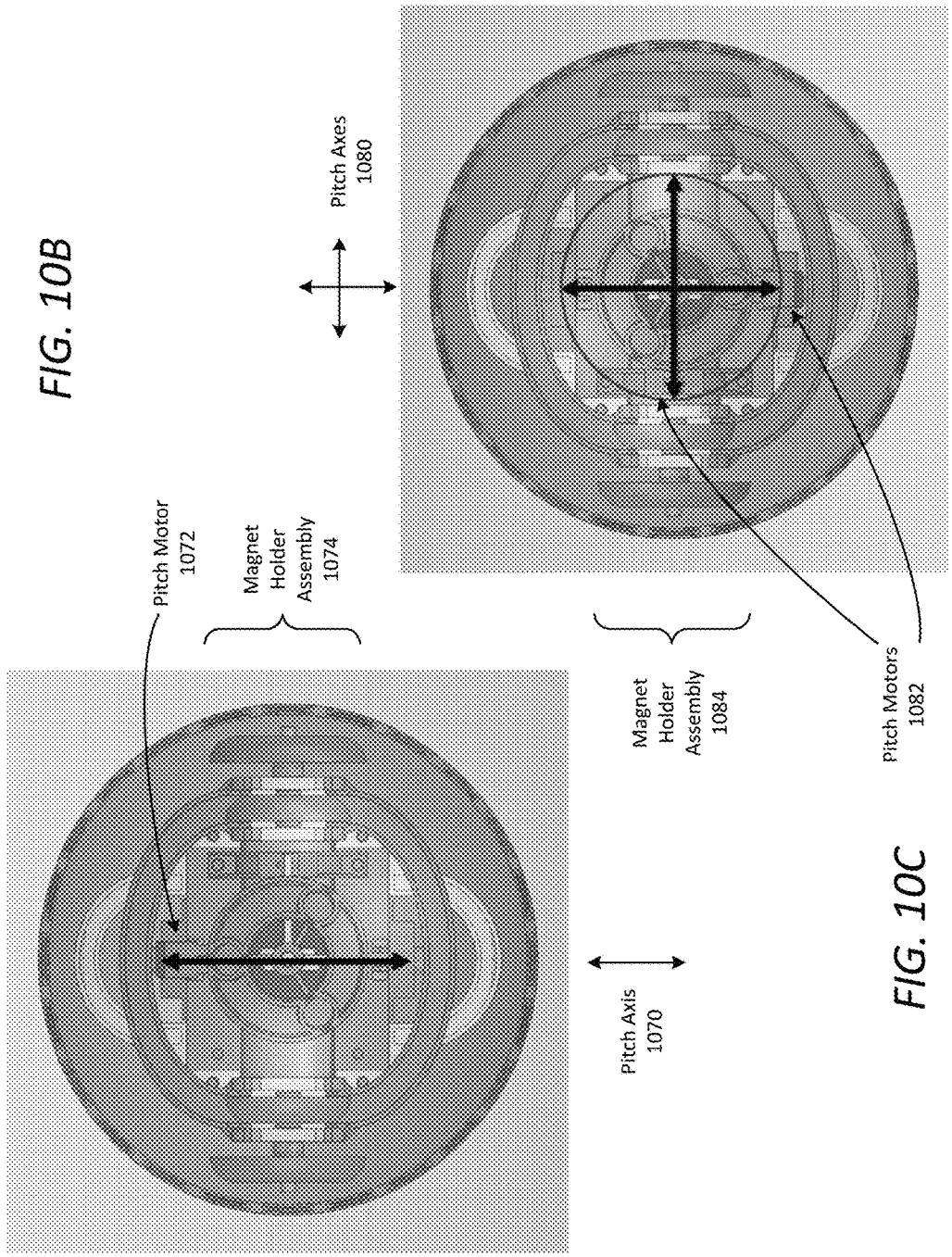

MULTI-BODY SELF PROPELLED DEVICE WITH INDUCTION INTERFACE POWER TRANSFER

CROSS-REFERENCE TO RELATED APPLICATIONS

U.S. Patent Application No. 62/311,383, filed Mar. 21, 2016, entitled "SELF-PROPELLED DEVICE WITH MAGNETIC COUPLING" is fully incorporated herein by reference for all purposes.

BACKGROUND

Remote controlled devices have previously been operated using specialized remote controllers specific to a particular device. Accessories to remote controlled devices typically involve mechanical physical fastening means to connect the accessories to portions of a frame or housing.

BRIEF DESCRIPTION OF THE DRAWINGS

The disclosure herein is illustrated by way of example, and not by way of limitation, in the figures of the accompanying drawings and in which like reference numerals refer to similar elements, and in which:

FIGS. 3A and 3B illustrate example turn states of the multi-body self-propelled device under operative control by a controller device;

FIGS. 4A and 4B illustrate example multi-body self-propelled devices that include induction interfaces, according to examples described herein;

FIGS. 9A and 9B illustrate example yaw control implementations for a coupled head of a multi-body self-propelled device, according to examples described herein;

FIGS. 10B and 10C are top views of example self-propelled devices having single axis and multi-axis independent pitch control for a coupled head, according to examples described herein;

DETAILED DESCRIPTION

Figure 1A:
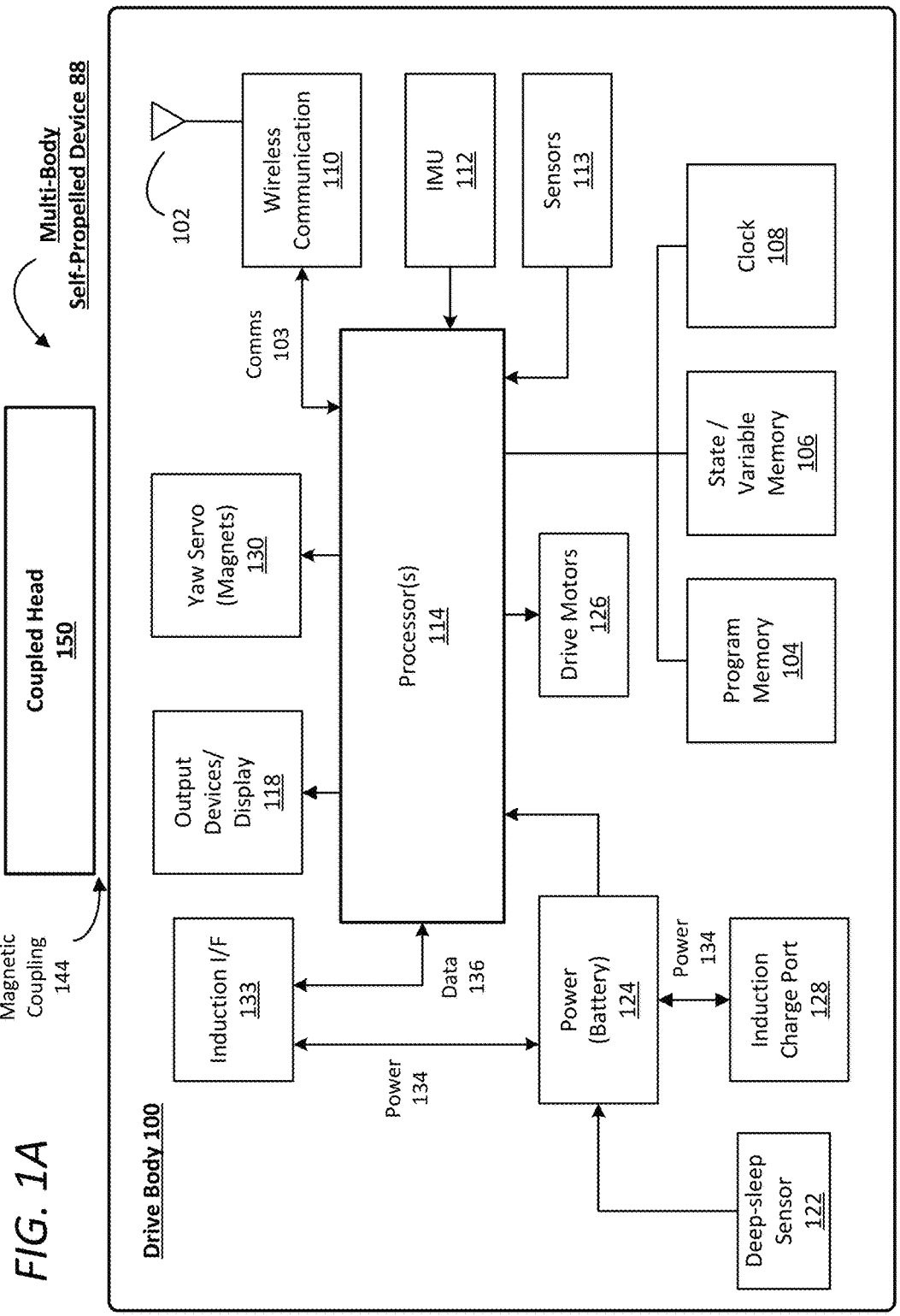
FIG. 1A is a block diagram illustrating an example system included in a drive body of a multi-body self-propelled device, according to examples described herein.

A multi-body self-propelled device is provided that can include a drive body and a magnetically coupled head. In many implementations, the drive body can comprise a spherical housing, an internal drive system, and a magnet holder or support assembly that holds one or more magnetic elements. The coupled head can house a corresponding set of one or more magnetic elements to maintain a magnetic interaction through the spherical housing of the drive body so that the coupled head remains substantially on a top portion of the drive body as the spherical housing rolls underneath. According to certain implementations, the magnet holder within the drive body can be coupled to the internal drive system. The internal drive system can ultimately propel and maneuver the self-propelled device by way of one or more independent motors and/or wheels.

In certain implementations, the coupled head can include a charge port receive power from an external source (e.g., a wall outlet) to charge a power source of the coupled head (e.g., one or more batteries). In some aspects, the coupled head can include an induction interface to inductively transfer power to the drive body via a corresponding induction interface of the drive body. Thus, in such variations, the drive body can receive power from the coupled head to charge a local power source (e.g., one or more batteries). Additionally or alternatively, the drive body can independently receive power via inductive transfer from a in inductive charging dock. As provided herein, each induction interface can comprise one or more coils (e.g., copper coils) that can transfer power and/or data inductively. Each of the coupled head and drive body can further include electronic components, such as processing units or controllers, a camera, microphone, audio output devices, lighting elements, servos or actuators, and/or memory resources to store program libraries to enable multiple modes of the multi-body self-propelled device. In one implementation, data can be transferred between the drive body and the coupled head via, for example, data coils of the induction interfaces.

In one implementation, the drive body can includes two induction interface: one to receive power inductively from an inductive charging station or dock upon which the drive body is seated; and the other to transfer power and or data with the coupled head. According to some examples, the coupled head can include the primary processing resources of the multi-body self-propelled device, and can receive control signals (e.g., wireless data signals and/or voice inputs) from a controller device or user. The processing resources of the coupled head can translate the control signals into commands to operate the multi-body self-propelled device. Such commands can include locomotion commands to be executed on the internal drive system of the drive body to accelerate and maneuver the multi-body self-propelled device. As such, independent motors and wheels of the internal drive system can engage an inner surface of the spherical-housing to cause the spherical housing to roll and maneuver based on the control signals received from the controller device and/or user. The translated locomotion commands can be transmitted to the drive body from the coupled head via the induction interfaces or via a local wireless connection (e.g., BLUETOOTH low energy). As an addition or alternative, processing resources of the drive body can receive and translate the control signals, or the drive body and coupled head can share processing load, for example, based on the particular mode of the multi-body self-propelled device (e.g., a partially autonomous or full autonomous mode).

In many examples, the magnetic coupling between the coupled head and the drive body can be separate and distinct from the inductive interactions, and can be produced by corresponding arrangements of magnetics in the coupled head and the drive body. In rudimentary examples, the coupled head can include a pair of magnets oriented to have opposite polarity such that a first magnet has its south pole facing downward, and the second magnetic has its north pole facing downward. In such examples, the pair of magnets in the drive body can also be oriented with opposite polarity such that an attractive magnetic interaction with the magnet pair of the coupled head is instigated. In such rudimentary implementations, yaw control of the coupled head can be controlled by the internal drive system of the drive body. In other words, as the internal drive system applies power to the independent motors to rotate within the spherical housing, the coupled head will also rotate in a correlated manner.

In variations, the coupled head can be configured to independently rotate by way of a yaw control motor, either located within the drive body or located within the coupled head itself. According to certain examples, the yaw control motor can be included within the coupled head to mechanically and independently rotate the coupled head in relation to the drive body. In such mechanical yaw control aspects, the coupled head can be comprised of a rotating housing portion and a stationary base plate that houses the magnetic elements of the coupled head. As provided herein, "stationary" in termed of the base plate means stationary with respect to the corresponding magnet holder within the drive body. Thus, the base plate of the coupled head and the magnet holder within the drive body can rotate and tilt in concert, while the rotating housing portion of the coupled head can be independently driven by the yaw motor and gearing system.

In certain examples, the coupled head can include a gear system driven by a yaw motor. The yaw motor can drive a pinion meshed with a gear (e.g., an internal or external ring gear) that is coupled to the rotating housing portion of the coupled head. Alternatively, the pinion driven by the yaw motor can drive an idler gear which can drive a larger internal ring gear. Such an arrangement may advantageously place the yaw motor closer to a yaw axis of the coupled head for increased stability. In further variations, the yaw motor can directly drive a yaw axle that is coaxial with the yaw axis of the coupled head, such that the yaw motor is also coaxial with the yaw axis. According to such mechanical implementations, yaw commands can be received from a controller device or can be autonomously generated by the multi-body self-propelled device (e.g., in response to sounds, voices, lights, facial recognition, etc.). The yaw commands can be executed on the yaw motor to independently and mechanically rotate the housing portion of the coupled head in relation to the spherical drive body.

In further variations, a yaw motor to independently rotate the coupled head (or a housing portion of the coupled head) can be located within the spherical drive body. The magnetic arrangements within the spherical drive body and the coupled head can include one or more stationary magnets—stationary in relation to a magnet support assembly and/or the internal drive system of the drive body—and a number of magnets on a rotatable element driven by the yaw motor. Thus, the rotation of the housing portion of the coupled head can be performed by way of rotating magnetic fields driven by a yaw motor within the drive body of the multi-body self-propelled device.

In certain examples, the magnet support assembly within the spherical drive body can include an inner holder and an outer ring, each holding one or more magnets. The coupled housing can include a corresponding arrangement of an inner holder and an outer ring, each also holding one or more magnets. According to some aspects, the inner holder can be rotatable and can include a plurality of magnets to magnetically couple with a corresponding plurality of magnets on the rotatable inner holder of the coupled head. In such examples, the yaw motor can drive the inner holder of the magnet support assembly within the drive body, which in turn can cause the corresponding inner holder of the coupled head to rotate correspondingly. The inner holder of the coupled head can be coupled to the housing portion of the coupled head (e.g., via an internal column) such that the housing portion rotates in accordance with the yaw motor in the drive body.

Alternatively, the outer rings of the drive body and the coupled head can be rotatably driven by the yaw motor within the drive body, and the inner holders can be stationary. In such examples, the magnet support structure within the drive body can drive the rotatable outer ring (e.g., via an axle, gear, thruster bearing, etc.). The rotation of the magnets disposed on the outer ring can cause the corresponding outer ring of the coupled head to rotate. Furthermore, the outer ring of the coupled head can be coupled to the housing portion such that when the outer ring is rotated, the housing portion of the coupled head is also rotated accordingly.

Throughout this disclosure, the term "substantially" may be used in varying context for purpose of expressly introducing a qualitative approximation to a statement. In many contexts, the term can be interpreted to mean at least 75% of a stated quantity, comparison, or measurement. In the context of an angular measurement, the term "substantially" means between zero degrees and less than 90 degrees of angular rotation relative to a referenced structure within the spherical housing when the self-propelled device is in motion. Accordingly, the term may be used in context as, for example, "substantially" stable, a "substantially" constant angle, "substantially" at a particular position on a rolling or stationary sphere, or "substantially" perpendicular with respect to an underlying surface on which the self-propelled device rolls. In such contexts, "substantially" can mean less than a 90 degree differential with respect to a vertical (or perpendicular) reference axis to the underlying surface, and typically less than 45 degrees, with respect to the vertical axis, while the self-propelled device is in a non-accelerated state. Thus, for example, as the self-propelled device is operated, the coupled head can remain within magnetic interaction with magnetically interactive elements within the spherical housing and residing on or within substantially vertically oriented components. As further used herein, "substantially" in the context of friction between the outer surface of the spherical housing and the contact surface of the coupled head device, means a below normal frictional relation between two typical smooth surfaces (e.g., polished metal or wood surfaces). Thus, a "substantially" frictionless material means a material designed or manufactured for reduced friction such as a TEFLON® or a DELRIN® coating.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, virtual reality (VR) or augmented reality (AR) headsets, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

FIG. 1A is a block diagram illustrating an example system included in a drive body of a multi-body self-propelled device, according to examples described herein. The drive body 100 can be operated to move under control of another device, such as a controller device operated by a user. The drive body 100 of the multi-body self-propelled device 88 can be configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device 88; (iv) generate an output response for its movement and state that it is software interpretable by the controller device; or (v) execute distinct modes, such as an autonomous mode, in response to a particular trigger.

In the context of examples described herein, the drive body 100 can comprise a housing (e.g., a hollow spherical housing) having an internal drive system disposed therein. The internal drive system can include one or more drive motors 126 (e.g., a pair of independent motors) that drive a propulsion means, such as one or more wheels, fans, or propellers. In certain implementations, the internal drive system is coupled to a magnet support assembly—also within the spherical housing—that enables a magnetic coupling 144 between the drive body 100 and a coupled head 150 of the multi-body self-propelled device 88. Extensive discussion of the mechanical aspects of the multi-body self-propelled device 88 is provided herein with respect to FIGS. 2-9. In many examples described herein, the multi-body self-propelled device 88 can be under operative control of a controller device, such as a mobile computing device executing a control application specific to operating the multi-body self-propelled device 88, or a wearable controller including an inertial measurement unit (IMU) outputting raw or processed sensor data. Additionally or alternatively, the multi-body self-propelled device 88 can execute a specified program from a program library that determines a mode of operation, or a manner in which the processor(s) 114 of the drive body 100 (or processing resources of the coupled head 150) are to interpret and/or translate control signals from a controller device, voice inputs from a user, sensor data from an IMU, and the like.

The drive body 100 can include several interconnected subsystems and modules. The processor 114 can execute programmatic instructions from a program memory 104. The instructions stored in the program memory 104 can be changed, for example to add features, correct flaws, or modify behavior. In some variations, the program memory 104 stores programming instructions that are communicative or otherwise operable with software executing on a linked controller device. The processor 114 can be configured to execute different programs of programming instructions, in order to alter the manner in which the drive body 100 interprets or otherwise responds to command inputs from different sources. As described herein, the drive body 100 may have multiple modes of operation, including the drive body 100 being controlled by a controller device providing commands or control signals, the drive body 100 being a controller for another device, and/or the drive body 100 being partially or wholly autonomously operated. Furthermore, the drive body 100 can execute mode instructions in conjunction with or under control of the coupled head, as described below with respect to FIG. 1B.

In some examples, the drive body 100 can share a computing platform with a controller device on which programming logic is shared, in order to: (i) enable the user to operate the controller device to generate multiple kinds of input, including simple directional input, command input, gesture input, motion or other sensory input, voice input or combinations thereof to operate the drive body 100; (ii) enable the drive body 100 to interpret input received from the controller device as a command or set of commands; and/or (iii) enable the drive body 100 to communicate data regarding the self-propelled device's 88 position, movement, and/or state in order to effect a state on the controller device (e.g., a display state to include content corresponding to a controller-user interface). In variations, the drive body 100 can further provide a programmatic interface that facilitates additional programming logic and/or instructions to operate the drive body 100. The controller device can execute programming that is communicative with the programming logic on the drive body 100.

A wireless communication module 110, in conjunction with a communication transducer 102, can serve to exchange data between the processor 114 and other external devices, such as the coupled head 150 and/or a controller device. The data exchanges, for example, provide communications, control, logical instructions, state information, and/or updates for the program memory 104. The processor 114 can generate output corresponding to state and/or position information, communicated to the controller device via the wireless communication module 110. The mobility of the drive body 100 may make wired connections undesirable. Thus, the term "connection" may be understood to mean a logical connection, such as a wireless link (e.g., BLUETOOTH low energy), made without a physical connection to drive body 100.

In variations, the wireless communication module 110 can implement BLUETOOTH communications protocol and the transducer 102 can comprise an antenna suitable for transmission and reception of BLUETOOTH radio signals. In alternative implementations, the wireless communication module 110 can operate under alternative communication protocols, such as Wi-Fi, WiGig, WiMax, cellular radio, radio frequency, or infrared protocols.

The drive body 100 can include an IMU 112 that can provide information about the drive body 100 and or multi-body self-propelled device 88 to the processor 114 and/or an external controller device. In some variations, the IMU 112 can include a three-axis gyroscope, a three-axis accelerometer, and/or a three-axis magnetometer. Additionally, the IMU 112 can provide input to enable the processor 114 to maintain awareness of the device's 88 orientation and/or position relative to an initial reference frame after the device 88 initiates movement. In various examples, the drive body 100 can include additional sensors 113, such as instruments for detecting light, temperature, humidity, touch, and/or measuring chemical concentrations or radioactivity. In one example, the sensors 113 include a capacitive sensor on an outer surface of the spherical housing. The processors 114 can detect a touch input on the capacitive sensor and, in response to the touch input, initiate a particular mode on the device 88. For example, a touch input on the capacitive touch sensor can indicate that the user is picking up the device 88 for use. Thus, in response to detecting the touch input, the processor 114 can transition the self-propelled device 88 from a sleep mode by initiating a predetermined set of actions 88 (e.g., wake up actions) using the various output devices 118 and motors 126 of the drive body 100, and also the various controllable parameters of the coupled head 150.

The drive body 100 can further include a state/variable memory 106 that can store information about the present state of the multi-body self-propelled device 88, including, for example, position, orientation, rates of rotation and translation about each Cartesian axis. In some aspects, the state/variable memory 106 can store information corresponding to an initial reference frame of the drive body 100 upon, for example, the self-propelled device 88 initiating operation or exiting a deep sleep mode (e.g., the self-propelled device 88 being switched on), as well as position and orientation information once the self-propelled device 88 is operating. In this way, some examples provide for the drive body 100 to utilize information of the state/variable memory 106 in order to maintain position and orientation information of the drive body 100 once the self-propelled device 88 starts moving. For example, the drive body 100 can comprise a spherical housing, and the state/variable memory 106 can continuously receive, store, and/or refresh IMU data from the IMU 112 in order to determine a present orientation in relation to the initial frame of reference.

The drive body 100 can also include a clock 108 that can provide timing information to the processor 114. In one example, the clock 108 can provide a time-base for measuring intervals and rates of change. In similar examples, the clock 108 can provide day, date, year, time, and/or alarm functions. In some examples, the clock 108 can further allow the multi-body self-propelled device 88 to provide an alarm or alert at pre-set times.

In some examples, the drive body 100 can include an expansion port (not shown) that can provide a connection for addition of accessories or devices. The expansion port can provide for future expansion, as well as flexibility to add options or enhancements. For example, the expansion port can be used to add peripherals, sensors, processing hardware, storage, displays, or actuators to the multi-body self-propelled device 88. In variations, the expansion port can provide an interface capable of communicating with a suitably configured component using analog or digital signals. Thus, the expansion port can provide electrical interfaces and protocols that are standard or well-known. Furthermore, the expansion port can implement an optical interface. In variations, the expansion port can comprise a specified interface, such as a universal serial bus (USB), mini-USB, Inter-Integrated Circuit Bus (I2C), Serial Peripheral Interface (SPI), or ETHERNET.

The drive body 100 can further include one or more output devices 118, such as a display, lighting elements, audio devices (e.g., a speaker), and or a haptic system. The output devices 118 can present or convey information or a state of the device 88 in a variety of forms. For example, the output devices 118 can produce light in colors and patterns, sound, vibration, music, or combinations of sensory stimuli. In one example, the output devices 118 can operate in conjunction with the drive motors 126, a yaw motor 130 (i.e., a motor that controls yaw for the coupled head 150), one or more output devices of the coupled head 150 (e.g., lighting elements, audio, a camera, a projector, etc.), and or a yaw motor disposed within the coupled head 150. As such, the output devices 118 can be utilized by the processor 114 in executing commands to control various systems of the multi-body self-propelled device 88 in order to perform predetermined actions, such as anthropomorphic actions in response to certain event (e.g., sounds or voice inputs, facial recognition, or a modal trigger).

In certain aspects, the output devices 118 can comprise a number of lighting elements, either in the visible or invisible range. Invisible light in the infrared or ultraviolet range may be useful, for example, to send information invisible to human senses but detectable by specialized detectors. In some examples, the output devices 118 can include an array of light emitting diodes (LEDs) emitting various light frequencies (e.g., RGB LEDs). In executing actions or commands, the processor 114 can control various controllable parameters of the LED array, such as brightness, color, individual LEDs or groupings, flash rates, and the like. The processor 114 can vary the relative intensity of each of the LEDs to produce a wide range of colors. In one example, one or more LEDs can indicate a reference point on the drive body 100 for alignment or calibration with a controller device. The reference LED(s) can be coupled to the internal drive system (e.g., a rearward facing side of the internal drive system), to enable a user to readily identify the orientation, or a forward operational direction, of the multi-body self-propelled device 88.

The drive body 100 can include a power source 124 that can store energy for operating the electronics and electromechanical components of the drive body 100, such as the processor(s) 114 and drive motors 126. In some examples, the power source 124 comprises one or more rechargeable batteries. In certain implementations, the power source 124 can be charged by power 134 received inductively from one or more sources. In one example, the drive body 100 can include an induction interface 133 (e.g., a first power coil) specific for transferring power from the coupled head 150. In such an example, power 134 can be received inductively from a corresponding induction interface of the coupled head 150 to recharge the power source 124. Accordingly, the induction interface 133 can be positioned on top of the internal drive system, and/or on a top position of a magnet support assembly, to align with the induction interface of the coupled head 150. In some aspects, the induction interface 133 can transfer power to the coupled head 150. In further aspects, the induction interface 133 includes one or more data coils to transmit and/or receive data 136 from the coupled head 150. However, as provided herein, separate data coils need not be necessary to transfer data between the induction interfaces 133, 158 of the drive body 100 and the coupled head 150 respectively. Rather, the same coils utilized to transfer power may also be utilized to transfer data between the drive body 100 and the coupled head 150. In still further aspects, the induction interface 133 can also be utilized to charge the power source 124 when the drive body 100 is separated from the coupled head 150 and placed on an inductive charging station or dock (e.g., with the internal components of the drive body 100 oriented upside down).

In still further implementations, the drive body 100 can include an induction charge port 128 (e.g., a second power coil) that can allow for recharging the power source 124 inductively from a inductive charging station with the internal components oriented right side up. Thus, in such implementations, the drive body 100 can include both the induction interface 133 to transfer power 134 and or data 136 with the coupled head 150, and the induction charge port 128 to receive power 134 directly from a charging dock.

In certain examples, the drive body 100 can further include a deep sleep sensor 122 to place the drive body 100 and/or the coupled head 150 into a very low power or "deep sleep" mode where most of the electronic devices use no battery power. The deep sleep sensor 122 can comprise a non-contact sensor that, for example, senses when the drive body 100 has been placed or seated on a charging dock to receive power 134 via the inductive charge port 128, or when power is being received inductively from the coupled head 150 via the induction interface 133. In some variations, the deep sleep sensor 122 can comprise a Hall Effect sensor mounted so that an external magnetic or inductive interaction can be detected by the Hall Effect sensor to activate the deep sleep mode.

As described herein, the drive body 100 can include drive motors 126 that propel an internal drive system of the multi-body self-propelled device 88. The drive motors 126 can convert electrical energy into mechanical energy by executing control commands generated or interpreted by the processor(s) 114. The drive motors 126 can propel and steer the multi-body self-propelled device 88 over an underlying surface. In some aspects, the drive motors 126 can comprise a pair of motors or multiple independent motors each driving a propulsion mechanism, such as a propeller or wheel. Thus, execution of individual control commands on each of the drive motors 126 can cause the multi-body self-propelled device 88 to accelerate, maneuver, perform tricks or predetermined maneuvers, execute error corrections to compensate for a dynamic instability of the drive system, and operate on all types of terrain and even water.

In certain aspects, the drive body 100 can receive and execute control signals via the wireless communication module 110 directly from a controller device or user. In variations, the wireless communications module 110 can comprise a local interface (e.g., BLUETOOTH low energy) to receive and/or transmit communications 103 with the coupled head 150. In such variations, the primary processing resources of the multi-body self-propelled device 88 can be contained in the coupled head 150 (e.g., the processor(s) 114 being excluded from the drive body), which can receive the control signals from the controller device and/or user, and transmit locomotion commands to the drive body 100 via the wireless communication module 110 or a data coil of the induction interface 133. Thereafter, the locomotion commands can be executed directly by simple controllers of the drive motors 126. Additionally, the drive body 100 can further receive yaw control commands from the coupled head 150 via the wireless communication module 110 or the induction interface 133, which can also be executed directly by a simple controller of the yaw motor 130 to rotate the coupled head 150, as described in further detail below.

In many examples, the internal drive system can include two parallel wheels, each mounted to an axle connected to an independently variable-speed motor 126 through, for example, a reduction gear system. Thus, the speeds of the two drive motors 126 can be variably and dynamically controlled by the processor 114.

According to certain examples described herein, the drive body 100 can include a yaw motor 130 to control rotation of a magnet support structure holding a number of magnets or magnetically interactive elements (e.g., ferrous materials) for coupling the drive body 100 to the coupled head 150. Thus, the processor 114 can generate yaw control commands or pivot commands to be executed by the yaw motor 130 to ultimately control head turning of the coupled head 150. The magnets can comprise any number and any type or combine types of magnets, such as disc magnets, programmable magnets, or other manufactured magnets each having symmetrical or asymmetrical magnetic fields. Such magnets can include permanent magnets, temporary magnets (e.g., metals containing ferrite), electromagnets, and the like. Permanent magnets can be composed of rare earth magnetic material, such as neodymium, or other magnetic materials, such as samarium cobalt, alnico, ceramic, or ferrite. Furthermore, as described herein, the magnet support structure or assembly can include a stationary portion that is rigid to the internal drive system, and a rotating portion operable by the yaw motor 130. The stationary portion can hold one or more stationary magnets to couple with one or more corresponding stationary magnets of the coupled head 150, and the rotating portion can also include one or more magnets such that rotation of the rotation portion can cause a corresponding rotatable housing of the coupled head 150 to turn under control of the yaw motor 130. Further description of the rotational control of the coupled head 150 via the yaw motor 130 is provided below.

In certain variations, the drive body 100 and/or the multi-body self-propelled device 88 can be used as a controller for other network-connected devices. The drive body 100 can contain sensors 113 and wireless communication capability, and so it can perform a controller role for other devices. For example, the drive body 100 can be held in the hand and used to sense gestures, movements, rotations, combination inputs, and the like.

In some implementations, the drive body 100 and/or the coupled head 150 can execute a mode that enables full or partial autonomy. For example, the coupled head 150 or drive body 100 can receive a command (e.g., a voice command) that can cause the processing resources of the multi-body self-propelled device 88 to execute programmatic instructions to at least partially automate drive and action operations. For example, in a fully autonomous mode, the processing resources (of the coupled head 150 and/or the drive body 100) can autonomously drive around and respond to various sensor or IMU inputs, such as when a voice or face is detected, or when a collision event takes place. Thus, the drive body 100 and coupled head 150 of the self-propelled device 88 can operate in either an autonomous mode, a partially autonomous mode, or a controlled mode based on user initiated or situational or environmental triggers (e.g., a control command from a controller device, lighting conditions, a detected feature by a camera of the coupled head 150, etc.).

Figure 1B:
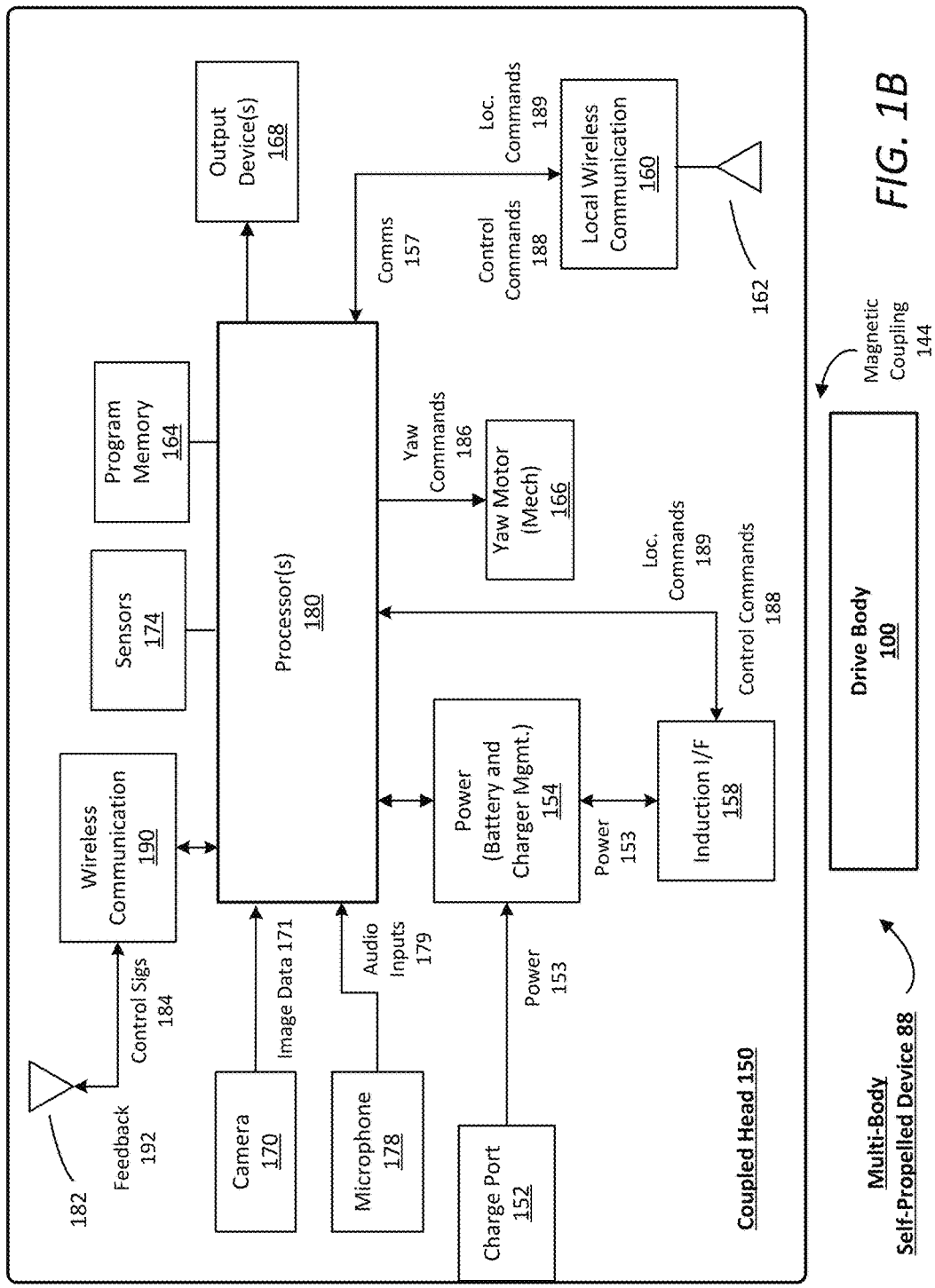
FIG. 1B is a block diagram illustrating an example system included in a coupled head of a multi-body self-propelled device, according to examples described herein.

FIG. 1B is a block diagram illustrating an example system included in a coupled head of a multi-body self-propelled device, according to examples described herein. Various components shown with respect to FIG. 1B can substitute certain components and functionality discussed with respect to the drive body 100 described in connection with FIG. 1A. For example, the processing resources of the multi-body self-propelled device 88 can be contained entirely in the coupled head 150, and the drive body 100 may contain a communication means (e.g., a BLUETOOTH low energy module or inductive data coil) and a basic controller for execution of locomotion commands generated by the processing resources in the coupled head 150. Furthermore, the coupled head 150 can include the program memory 164 for executing the various modes of the multi-body self-propelled device 88. As described, the coupled head 150 can include any number of magnets or magnetically interactive elements (e.g., ferrous materials) to maintain a magnetic coupling 144 with the corresponding magnetic elements in the drive body 100, and can include a rotatable portion, including a number of magnets, that rotates under operation of a yaw motor 130 of the drive body, and a stationary base plate that remains static with respect to a corresponding stationary magnet holder within the drive body 100. Further discussion of the mechanical aspects and coupling between the coupled head 150 and the drive body 100 are provided below.

According to examples disclosed herein, the coupled head 150 can include a wireless communication module 190 coupled to an antenna 182 to transmit and/or receive communications from an external device. For example, the wireless communication module 190 can receive control signals 184 from a controller device to operate the multi-body self-propelled device 88. Based on the control signals 184, the processor 180 can execute a particular instruction set in the program memory 164 (e.g., a particular mode corresponding to one of any number of control applications executing on the controller device) to interpret or otherwise translate the control signals 184 into control commands 188 for execution on the various controllable components of the coupled head 150 and/or the drive body 100. The wireless communication module 190 can execute a wireless protocol, such as a BLUETOOTH, Wi-Fi, WiGig, WiMax, cellular radio, radio frequency, or an infrared protocol to transmit and/or receive communications from the controller device.

In some aspects, the processor(s) 180 can translate the control signals 184 to generate a particular output via output devices 168 of the coupled head 150. Such output devices 168 can include haptic, audio, and/or visual devices (e.g., lights, projector system, display, etc.). The coupled head 150 can further include a microphone 178 to receive audio inputs 179, which can be processed by the processor(s) 180 to, for example, execute a particular mode or cause the self-propelled device 88 to perform one or more actions. The coupled head 150 can further include a camera 170, which can have a field of view extending from an oculus or transparent opening on the housing of the coupled head 150. The camera 170 can comprise a digital video recorder generating image data 171 (e.g., a video feed), which can be processed by the processor(s) 180 to perform feature or facial recognition, or to enable the self-propelled device 88 to avoid obstacles in an autonomous mode. Additionally or alternatively, the image data 171 can be streamed to a controller device via the wireless communication module 190, or can be recorded for subsequent retrieval.

The coupled head 150 can further include a power source 154, such as one or more batteries, to provide power to the various components of the coupled head 150. In certain implementations, the power source 154 can be charged via a charge port 152. The charge port 152 can comprise, for example, a USB or mini-USB interface to receive power from an external source, such as a wall outlet. Thus, the power source 154 can receive power 153 from the charge port 152 when the multi-body self-propelled device 88 is physically plugged into an external power source.

In certain implementations, the coupled head 150 can include an induction interface 158 comprising a power coil to transfer power 153 with the corresponding induction interface 133 of the drive body 100. In some examples, the power source 154 can be charged via the induction interface 158 by receiving power 153 inductively from the drive body 100 or an external inductive charging dock (e.g., when the coupled head 150 is placed on the charging dock separately from the drive body 100). In one example, the power source 154 can include a charge management component to provide charge balancing between the power source 154 of the coupled head 150 and the power source 124 of the drive body 100. For example, the charge management component can be configured to provide a 50/50 balance of the received power 153 from the charge port 152 to the power sources 154, 124 of the coupled head 150 and drive body 100 respectively.

Additionally, the induction interface 158 can include a data coil so that the processor 180 can transmit control commands 188—such as locomotion commands 189—to the induction interface 133 of the drive body 100 for execution on the internal drive system. As an alternative, the coupled head 150 can include a local wireless communication module 160, coupled to an antenna 162, to transmit and/or receive communications 157 from the drive body 100. For example, the processor(s) 180 can interpret control signals 184 as control commands 188 for implementation on the various servos, motors, and/or actuators of the multi-body self-propelled device 88 (i.e., both the coupled head 150 and the drive body 100). The control commands 188 can include locomotion commands 189 specific for propelling the self-propelled device 88. That is, the processor 180 of the coupled head 150 can translate the control signals 184 from a controller device into locomotion commands 189 that are to be implemented on the drive motors 126 of the drive body 100. The processor 180 may then transmit the locomotion commands 189 to the drive body 100 via the local wireless communication module 160 or, in certain examples, the data coil of the induction interface 158.

As provided herein, the local wireless communications module 160 can implement a suitable wireless protocol, such as BLUETOOTH low energy or Wi-Fi to transmit the control commands 188 and/or locomotion commands 189 to the drive body 100. Additionally, the processor 180 can receive communications 157 from the drive body 100, such as state information, feedback data, IMU data, and/or sensor data from the various components of the drive body 100. In variations, the coupled head 150 can include a sensor set 174 comprising an IMU, or one or more of an accelerometer, gyroscopic sensor, magnetometer, and the like. The processor 180 can utilize sensor data from the sensors 174 in order to, for example, provide feedback data 192 to the controller device, or make control corrections and/or maintain or control an orientation (e.g., a yaw direction).

In certain examples, the coupled head 150 can include the yaw motor 166 to control a mechanical rotation mechanism of the coupled head 150. For example, the yaw motor 166 can be coupled to a gear system affixed to a rotatable housing portion of the coupled head 150 (described in detail below with respect to FIGS. 9A and 9B). The housing portion can rotate in relation to a base plate that includes one or more magnets to couple with one or more corresponding magnets of the drive body 100. In such variations, the drive body 100 can include only stationary magnet elements on a central holder, and can exclude the rotatable magnet holder and can further exclude the yaw motor 130 that drives the rotatable magnet holder. Thus, rotation of the housing portion of the coupled head 150 can be produced locally and mechanically by the yaw motor 166 within the coupled head 150. For example, the processor 180 can translate certain control signals 184 into yaw commands 186 executable by the yaw motor 166 to rotate the rotatable housing portion of the coupled head 150 dynamically.

Accordingly, the magnetically coupled drive body 100 and head 150 can be controlled to maneuver around a given space by a user operating a controller device, or can be implemented in an autonomous or partially autonomous mode utilizing input devices (e.g., a microphone 178 and/or camera 170), an IMU 112, and or sensors 113, 174. The mode of the multi-body self-propelled device 88 can be determined or otherwise triggered by the specified control application executing on the controller device, such as a particular game executing on a mobile computing device. Thus, multiple software applications can be provided to users that, when executed on a mobile computing device, can establish a communication link to the self-propelled device 88. Depending on the executing application on the mobile computing device, the processing resources of the self-propelled device 88 can execute a specified instruction set in a program library 104, 164 to initiate a specified mode. Additionally or alternatively, the mode of the self-propelled device 88 can be triggered by an alternative cause, such as detection of a nearby user (e.g., via a proximity sensor), a voice command, and the like. Additionally or alternatively, the self-propelled device 88 can be triggered to operate in an autonomous or partially autonomous mode (e.g., a companion mode) to, for example, follow a user or a beacon from a beacon source (e.g., a small portable module or key fob-like component) and/or autonomous interact with the user. In variations, the self-propelled device 88 can execute a roaming mode to randomly roam around a given space to either search for a user using the camera 170 (e.g., in a certain gameplay mode, such as a hide-and-seek mode), or attempt to interact with other humans.

Multi-Body Self-Propelled Device

Figure 2:
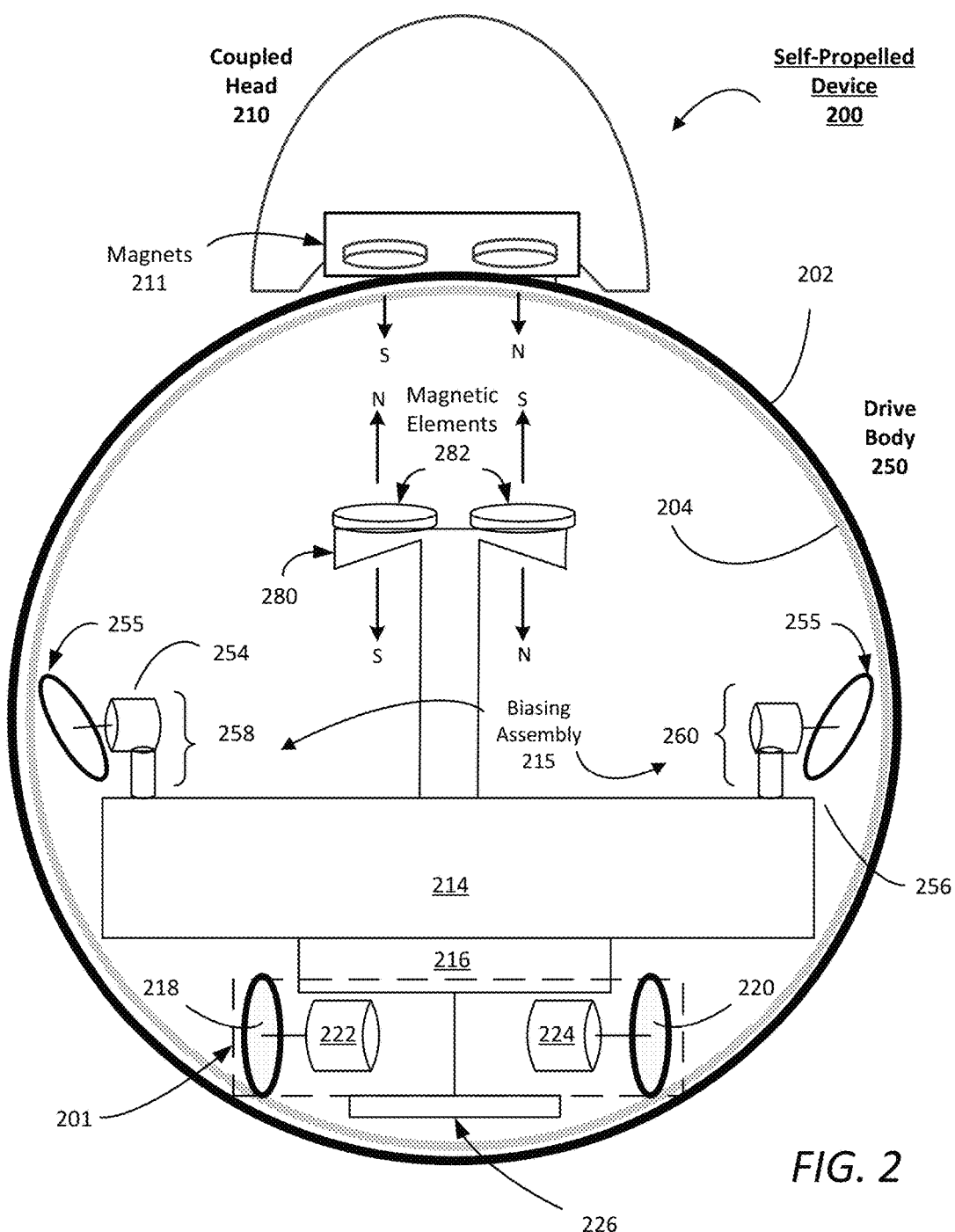
FIG. 2 is a schematic diagram illustrating an example multi-body self-propelled device 200 in the form of a robotic spherical ball including the coupled head as a passive attachment, in accordance with example implementations.

FIG. 2 is a schematic diagram illustrating an example multi-body self-propelled device 200 in the form of a robotic spherical ball including the coupled head as a passive attachment, in accordance with example implementations. As shown, the self-propelled device 200 can include a spherical housing 202 with an outer surface that makes contact with an external surface as the device 200 rolls and maneuvers. In addition, the spherical housing 202 of the multi-body self-propelled device 200 can include an inner surface 204. Additionally, the self-propelled device 200 can include several mechanical and electronic components enclosed by the housing 202.

In the described example, the housing 202 can be composed of a material that transmits signals used for wireless communication, yet is impervious to moisture. The housing material can be durable, washable, and/or shatter resistant. Furthermore, the housing 202 may also be structured to enable transmission of light and can be textured to diffuse the light.

In one example, the housing 202 can be made of a sealed polycarbonate plastic. Additionally, the housing 202 can be comprised of two hemispherical shells with an associated attachment mechanism, such that the housing 202 can be opened to allow access to the internal electronic and mechanical components.

Several electronic and mechanical components can be located inside the housing 202 for enabling processing, wireless communication, propulsion, and other functions. In an example, the components include a drive system 201 to enable the self-propelled device 200 to propel itself. The drive system 201 can be coupled to processing resources and other control mechanisms, as described with other examples. Referring again to FIG. 2, a carrier 214 can be included as an attachment point and support for the internal components of the self-propelled device 200. Thus, the components of the self-propelled device 200 are not rigidly attached to the housing 202. Instead, the drive system 210 is in frictional contact with the inner surface 204, and is movable within the housing 202 by the action of actuators 222, 224 of the drive system 201.

The carrier 214 can be electrically couple to a power source 216. The power source 216 can provide a reservoir of energy to power the self-propelled device 200 and the electronics, and can be replenished through an inductive charge port 226. In one example, the power source 216 can comprise one or more rechargeable batteries, such as certain types of lithium polymer cells.

The carrier 214 can provide the mounting location for most of the internal components, including a printed circuit board for electronic assemblies, sensor arrays, antennas, and connectors, as well as providing a mechanical attachment point for internal components.

In certain examples, the drive system 201 can include a pair of independent motors 222, 224 and wheels 218, 220. The independent motors 222, 224 can connect to the wheels 218, 220, respectively, each through an associated shaft, axle, and/or gear drive. The perimeter of the wheels 218, 220 comprise two locations where the drive system 201 is in mechanical contact with the inner surface 204 of the spherical housing 202. The locations where the wheels 218, 220 contact the inner surface 204 may be an essential part of the drive mechanism of the self-propelled device 200, and so the wheels 218, 220 may be coated or covered with a material to increase friction and reduce slippage. For example, the wheels 218, 220 may be coated with a silicon compound.

In some implementations, a biasing assembly 215 is provided to actively force the wheels 218, 220 against the inner surface 204. In an example, the biasing assembly 215 can include one or more biasing components 254, 256 that provide contact force with the inner surface 204 of the spherical housing to reduce slippage of the wheels 218, 220—particularly in situations where the drive system 201 is not positioned with the wheels 218, 220 at the bottom and where gravity does not provide adequate force to prevent the drive wheels 218, 220 from slipping. The biasing elements 254, 256 can comprise portal axles 258, 260 (e.g., spring loaded pushers) selected to provide a force pushing the wheels 218, 220 against the inner surface 204 of the spherical housing 204.

The contact portions 255 of the biasing elements 254, 256 can be designed to provide near-frictionless contact with the inner surface 204. In certain examples, the contact portions 255 can comprise rounded surfaces that coincide with the inner surface 204 of the spherical housing 202. Additional mechanisms of providing near-frictionless contact may be provided. In another implementation, the rounded contact points 255 may include one or more bearings or wheels to further reduce friction at the contact point where the contact portions 255 meet the inner surface 204.

In an example, self-propelled device 200 can further include magnetic elements 282 which are supported within spherical housing 202 and which magnetically interact with complementary magnetic elements 211 of the coupled head 210. The magnetic interaction and coupling can occur and/or be maintained while the self-propelled device 200 is controlled in motion.

In an example illustrated by FIG. 2, the biasing assembly 215 can comprise two or more separate portal axles 258, 260 to actively force the drive system wheels 218, 220 against the inner surface 204. The portal axles 258, 260 may include biasing elements 254, 256 (comprising springs) which include contact portions 255 that press against the inner surface 204 with a force vector having a vertical value. The vertical force from the bias springs 254, 256 pressing against the inner surface 204 actively forces the drive system 201 and its respective wheels 218, 220 against the inner surface 204, thereby providing sufficient force for the drive system 201 to cause the self-propelled device 200 to move.

The portal axles 258, 260 comprising the independent biasing elements 254, 256 can be mounted directly onto the carrier 214, or can be mounted to an internal structure that is mounted to the carrier. The biasing elements 254, 256 coupled to the portal axles 258, 260 may be in the form of torsion springs which instigate a force against the inner surface 204. As an addition or alternative, the biasing elements 254, 256 may be comprised of one or more of a compression spring, a clock spring, or a tension spring. Alternatively, the portal axles 258, 260 can be mounted, without inclusion of springs, to maintain a force pressing the drive system 201 and wheels 218, 220 against the inner surface 204, and allow sufficient traction to cause the self-propelled device 200 to move.

According to many examples, the self-propelled device 200 can include an inductive charge port 226 to enable inductive charging of a power source 216 used to provide power to the independent motors 222, 224 that power the wheels 218, 220. The self-propelled device 200 can further include a magnet holder 280 coupled to the carrier 214 or a support structure within the housing 202. The magnet holder 280 can include a set of magnetically interactive elements 282, such as elements comprised of ferrous materials, and/or electromagnets or permanent magnets. Likewise, the coupled head 210 can also include complementary magnets 211 for enabling the magnetic coupling. Thus, the magnet holder 280 and the coupled head 210 can comprise one or more of any combination of magnetically interactive metals, ferromagnetic elements, neodymium, yttrium/cobalt, alnico, or other permanent elemental magnets, other "rare-earth" magnets, electromagnets, etc.

In variations, the magnet holder 280 can include a set of magnetic elements 282 (e.g., a magnet pair) which can be oriented to have opposing polarity (as shown). For example, as shown with other examples, the magnetic elements 282 can include a first magnet and a second magnet, where the first magnet can be oriented such that its north magnetic pole faces upwards and its south magnetic pole faces downwards. The second magnet can be oriented such that its south magnetic pole faces upwards and its north magnetic pole face downwards.

In variations, the magnet holder 280 and the coupled head 210 can each house any number or combination of complementary magnets or magnetic components. For example, a single magnetic component may be housed in either the drive body 250 or in the coupled head 210, and can be arranged to magnetically interact with a plurality of magnetic components of the other of the coupled head 210 or the drive body 250. Alternatively, for larger variations, magnetic arrays of three or more magnets may be housed within the spherical housing 202 to magnetically interact with a corresponding magnetic array of the coupled head 210.

In some examples, the biasing assembly 215 is formed such that the wheels 218, 220 and the contact ends 255 of the biasing elements 254, 256 are constantly engaged with the inner surface 204 of the spherical housing 202. As such, much of the power from the motors 222, 224 is transferred directly to rotating the spherical housing 202, as opposed to causing the internal components (i.e., the biasing assembly 215 and internal drive system 201) to pitch. Thus, while motion of the self-propelled device 200 may be caused, at least partially, by pitching the internal components (and therefore the center of mass), motion may also be directly caused by active force of the wheels 218, 220 against the inner surface 204 of the spherical housing 202 (via the biasing assembly 215) and direct transfer of electrical power from the motors 222, 224 to the wheels 218, 220. As such, the pitch of the biasing assembly 215 and internal drive system 201 may be substantially reduced, and remain substantially constant (e.g., substantially perpendicular to the external surface on which the self-propelled device 200 moves). Additionally or as an alternative, the pitch of the biasing assembly 215 and internal drive system 201 may increase (e.g., to over 45 degrees) during periods of hard acceleration or deceleration. Furthermore, under normal operating conditions, the pitch of the biasing assembly 215 and internal drive system 201 within the spherical housing 202 can remain stable or subtly vary (e.g., within 10-15 degrees).

In some variations, the magnetic elements 282 can be replaced or augmented with magnetic material, which can be included on, for example, the biasing elements 254, 256. As such, the biasing elements 254, 256 can include or be formed of a magnetic material, such as a ferrous metal. Such metals can include iron, nickel, cobalt, gadolinium, neodymium, samarium, or metal alloys containing proportions of these metals. In any case, the magnetic elements 282, whether included on the magnetic holder 280 or as a part of the biasing assembly 215, can produce a magnetic field extending beyond the outer surface of the spherical housing 202 to magnetically couple with the coupled head 210.

In further examples, one or more of the magnetic elements 282, and/or the complementary magnets 211 of the coupled head 210 can comprise any number of electro- or permanent magnets. Such magnets may be irregular in shape or manufactured or programmed to provide symmetrical or asymmetrical magnetic fields for added stability. For example, the magnetic elements 282 of the self-propelled device 600 can be a single or multiple magnetic strips with an asymmetrical field, and can couple with one or more complementary magnetic strips of the coupled head 210 such that the coupled head 210 has one or more default orientations on top of the drive body 250. Thus, when the coupled head 210 rotates in relation to the magnetic elements 282 within the drive body 250, a clocking or compassing force—due to the asymmetry in the fields—can rotate the coupled head 210 back to a default orientation. Alternatively, the magnetic coupling between the drive body 250 and the coupled head 210 can be one which creates a stable magnetically repulsive state, or a combination of repulsive and attractive states. For example, the magnet holder 280 can comprise a rotating portion than can include magnets that are oriented to repel a corresponding set of magnets on a rotating portion of the coupled head 210. A stationary set of magnets can also be included on both the magnet holder 280 and the coupled head 210, and can be oriented to attract. Further discussion of the magnet holder 280 arrangements are provided below with respect to FIGS. 6-8.

FIGS. 3A and 3B illustrate example turn states of the multi-body self-propelled device under operative control by a controller device. The self-propelled device 300 is depicted from a front view as shown in FIGS. 3A and 3B. A user input on the controller device 302 to execute a turn is shown. For example, the user may provide an input to turn the self-propelled device 300 right, as shown in FIG. 3A. The self-propelled device 300 can receive the input, and implement the turn command on the internal drive system, which can cause the internal components to pitch and roll accordingly. As the internal components pitch and roll to execute the turn, the coupled head can also roll correspondingly (as shown), maintaining the magnetic interaction with the internal magnets of the drive body. FIG. 3B depicts a user input on the controller device to turn the self-propelled device 300 left, where the internal components, along with the coupled head pitch and roll accordingly.

Induction Interfaces

FIGS. 4A and 4B illustrate example multi-body self-propelled devices that include induction interfaces, according to examples described herein. As provided, various components shown and described with respect to FIGS. 1A and 1B are omitted for simplicity, but may still be included as components of the drive body 410, 450 and the coupled head 400, 460 shown and described with respect to FIGS. 4A and 4B. Referring to FIG. 4A, the coupled head 400 can include a charge port 402, such as a USB or mini-USB port for receiving power from an external power source 420 (e.g., a wall outlet) to charge a power source 406 of the coupled head 400. Additionally, the coupled head 400 can include a charge interface 404 that can selectively control power distribution between the power source 406 of the coupled head 400, and the power source 414 of the drive body 410. According to examples described herein, the coupled head 400 can include an induction interface 408 to transfer power to an induction interface 412 of the drive body 410. Thus, the drive body 410 need not include a plug-in charge port, and can be configured to only receive power inductively from the coupled head 400. In variations, the induction interfaces 408, 412 of the coupled head 400 and drive body 410 can enable independent charging on an inductive charging station (not shown).

Referring to FIG. 4B, the charge port 402 of the coupled head 460 may be excluded in favor of an additional induction interface 452 within the drive body 450. For example, the drive body can include a lower induction interface 452 that can receive power inductively through the spherical housing from an external charging dock 470, which itself may be plugged into a power source 480 such as a wall outlet. Power that is inductively received from the external charging dock 470 via the lower induction interface 452 can be transferred to the power source 456 of the drive body 450. In some aspects, the drive body 450 can include a charge interface 455 to manage the power transfer between the power source 456 of the drive body 450 and the power source 464 of the coupled head 460. Accordingly, the charge interface 455 can execute charge balancing (e.g., 50/50) such that the power source 456 of the drive body 450 and the power source 464 of the coupled head 460 are charged evenly.

Power transfer between the drive body 450 and the coupled head 460 can be initiated via an upper induction interface 458 of the drive body 450 and an induction interface 462 of the coupled head 460. Thus, as power is received from the external charging dock 470 via the lower induction interface 452, the charge interface 455 can transfer power to the upper induction interface 458 for inductive transfer to the induction interface 462 of the coupled head 460 in order to charge the power source 464 of the coupled head 460. As described herein, the power sources 456, 464 of the drive body 450 and the coupled head 460 can provide power to the various electronic components of the separate devices.

In the above-examples discussed with respect to FIG. 4A, one of the power sources 406, 414 may be excluded, and sufficient power may be transmitted from a single power sources over the induction interfaces 408, 412 to power the components of the drive body 410 or the coupled head 400. For example, a single power source 406 in the coupled head 400 can be utilized with the power source 414 in the drive body 410 excluded. Similarly, the arrangement shown in FIG. 4B can be powered by a single power source 456 in the drive body 450, where sufficient power from the single power source 456 can be transmitted over the induction interfaces 458, 462 to the coupled head 460 to power the various electronic and electromechanical components therein.

Magnetic Yaw Control

Figure 5:
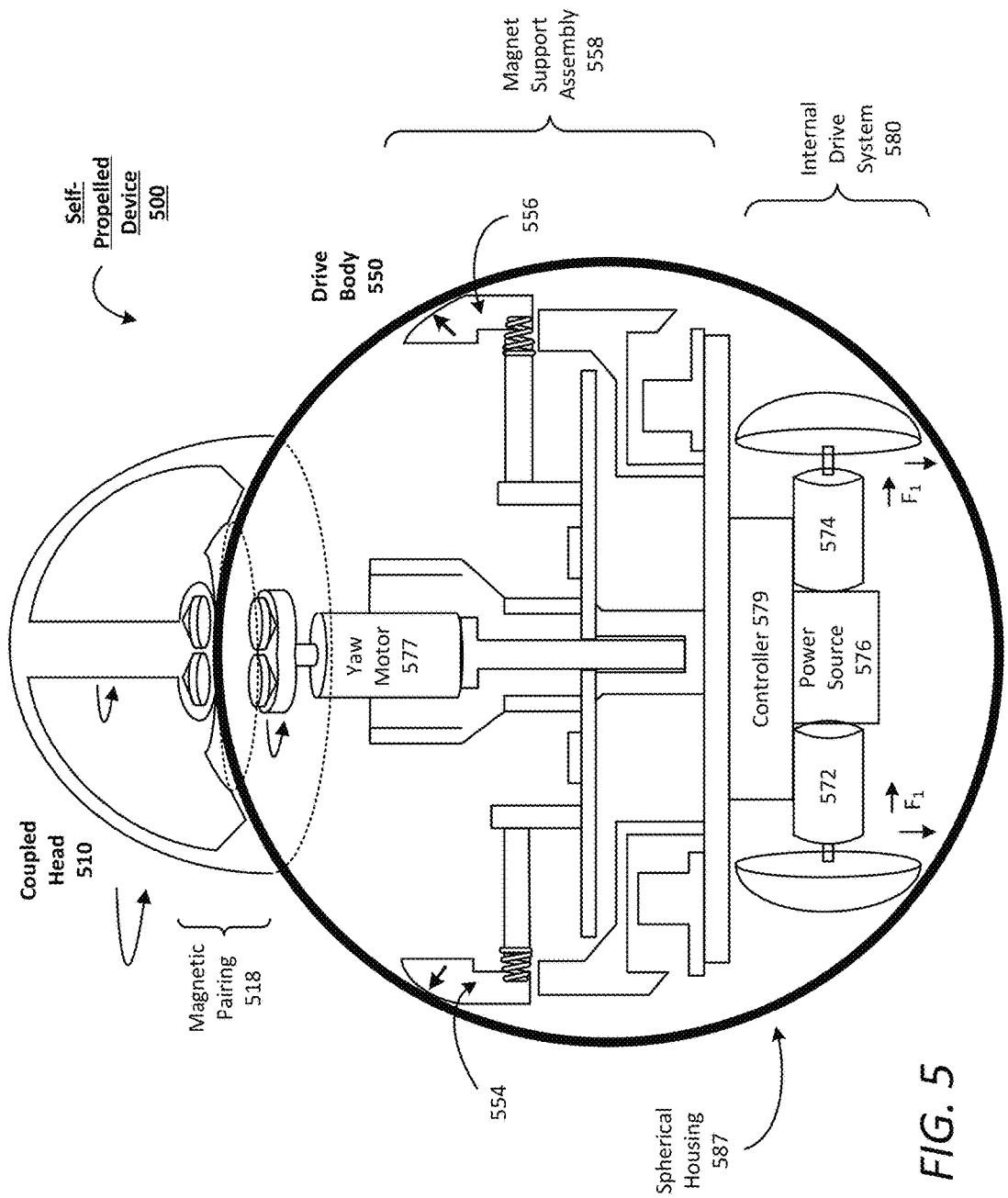
FIG. 5 is a schematic diagram showing an example multi-body self-propelled device including a yaw control motor for independently rotating a coupled head, according to examples.

FIG. 5 is a schematic diagram showing an example multi-body self-propelled device including a yaw control motor for independently rotating a coupled head, according to examples. As shown in FIG. 5, the drive body 550 of the multi-body self-propelled device 500 can include an internal drive system 580 comprising a set of independent motors 572, 574 each operating a respective wheel that continuously engages an interior surface of a spherical housing 587. The independent motors 572, 574 can be powered by a power source 576, and operated by a controller 579 of the internal drive system 580. The drive body 550 can further include a magnet support assembly 558 coupled to a top portion of the internal drive system 580. As described herein, the magnet support assembly 558 can include a number of biasing elements 554, 556 (e.g., spring-loaded elements) that provide a biasing force against the interior surface of the spherical housing 587, which in turn actively forces the wheels of the internal drive system 580 against the interior surface. This enables the wheels to drive the spherical housing 587 to rotate and roll along an underlying surface.

According to examples, the magnet support assembly 558 within the drive body 550 can include a number of magnets or magnetic elements which can cause a magnetic pairing 518 with a complementary set of magnets or magnetic elements within the coupled head 510 (as shown). Thus, as the spherical housing 587 rolls, maneuvers, accelerates, and decelerates, the magnetic pairing 518 enables the coupled head 510 to remain at a substantial stable position at the top of the drive body 550. Naturally, as the drive system 580 and magnet support assembly 558 pitch, roll, and rotate within the spherical housing 587, the coupled head 510 can generally track the pitch, roll, and yaw around the outer surface of the spherical housing 587 due to the magnetic pairing 518.

In various implementations, the magnetic elements of the drive body 550 can be rotated by way of a yaw control motor 577 coupled to the magnet support assembly 558. Thus, actuation of the yaw control motor 577 can cause the coupled head 510 to rotate independently of the movement of the spherical housing 587 underneath.

Figure 6:
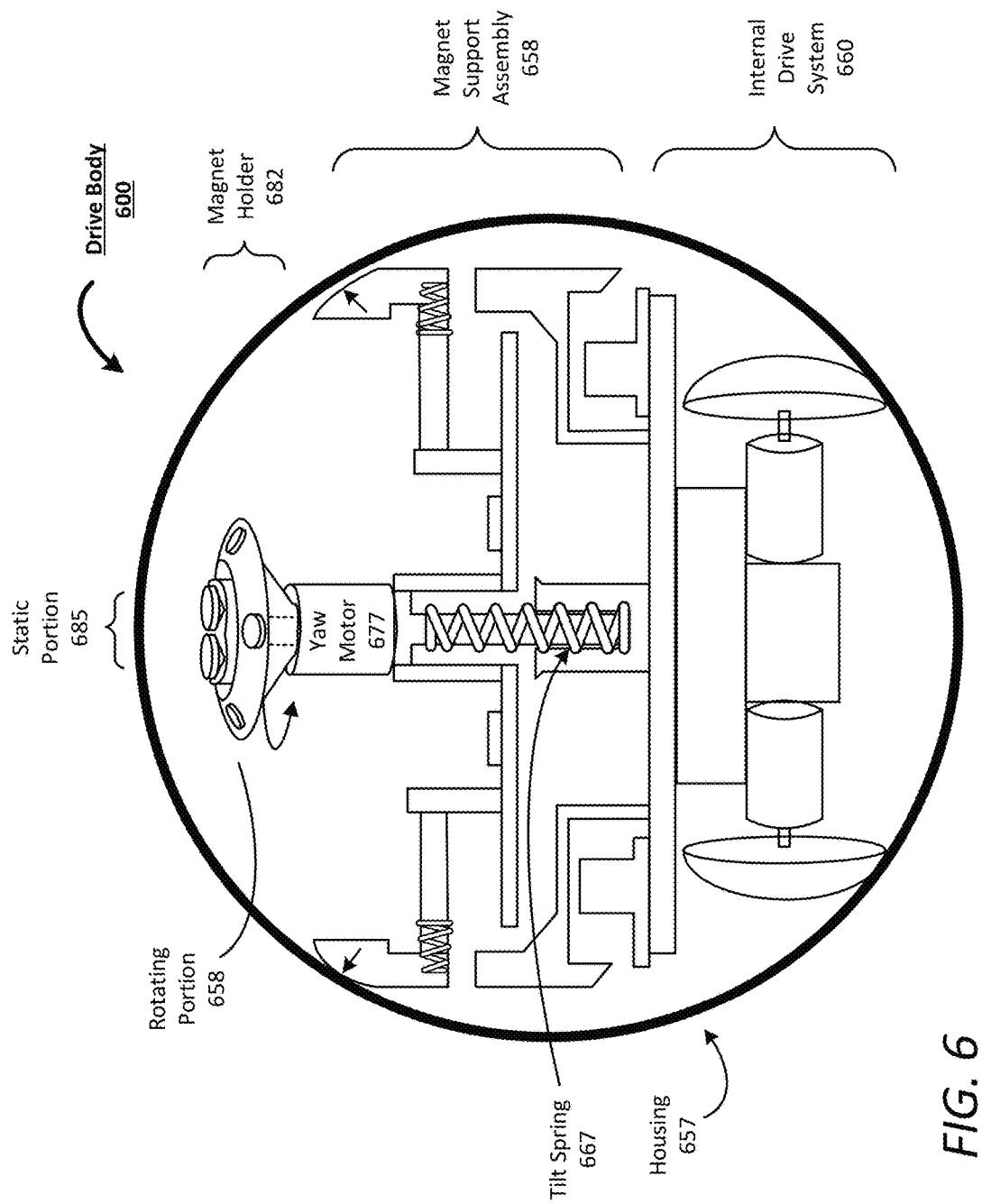
FIG. 6 is a schematic diagram showing an example drive body of a multi-body self-propelled device, in accordance with one or more examples described herein.
Figure 7:
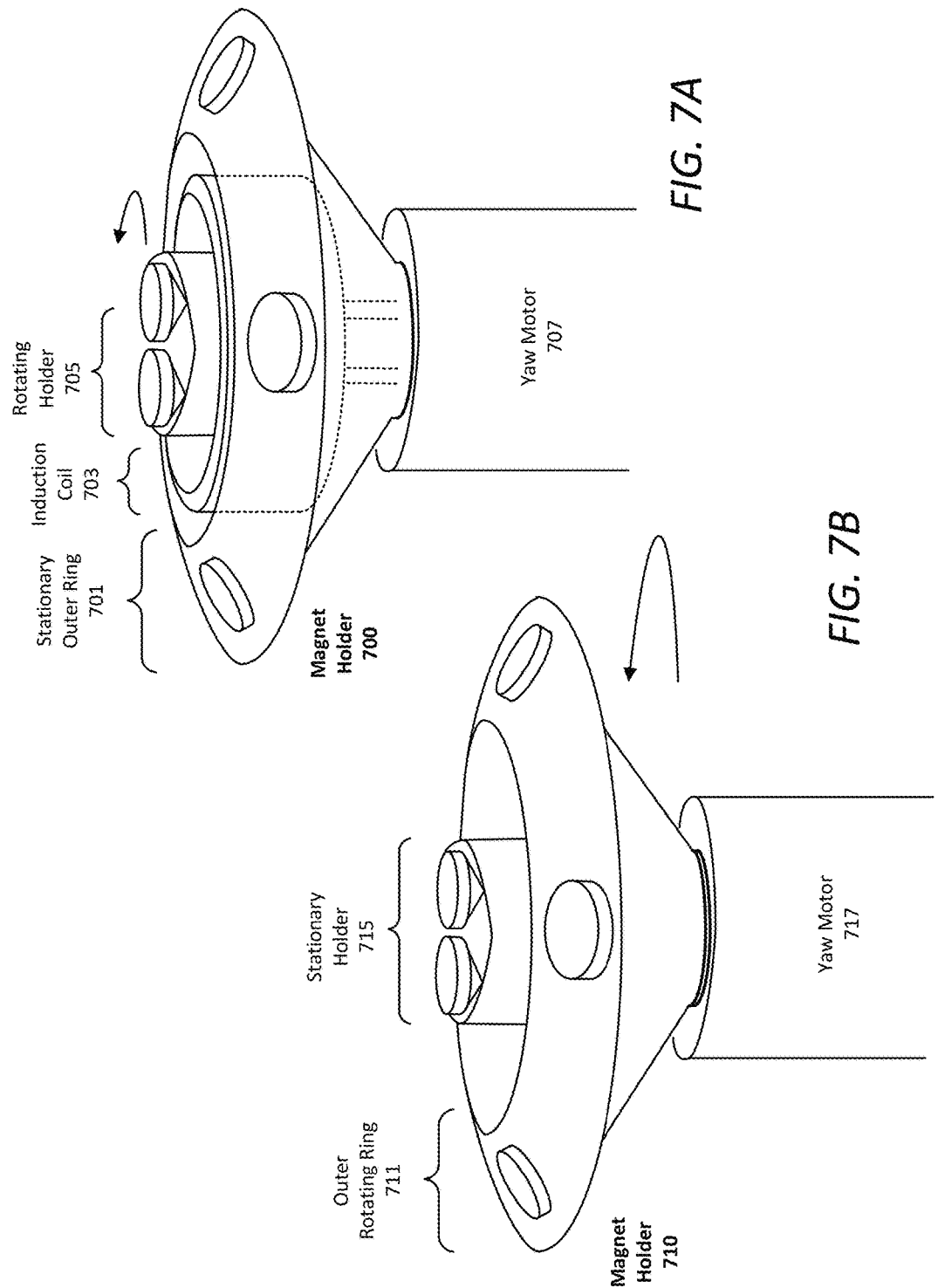
FIGS. 7A and 7B illustrate example yaw control motor configurations implemented on a multi-body self-propelled device, as provided herein.

FIG. 6 is a schematic diagram showing an example drive body of a multi-body self-propelled device, in accordance with one or more examples described herein. As described, the drive body 600 can include an internal drive system 660 that propels the self-propelled device via contact with an inner surface of the spherical housing 657. The magnet support assembly 658 can be mounted to a top portion the internal drive system 660, and can include biasing elements to actively force the wheels of the internal drive system against the inner surface of the spherical housing 657. In certain implementations, the coupling between the magnet support assembly 658 and the internal drive system 660 can include a tilt spring 667 to dampen shock on the magnet holder 682, which can aid in maintaining the magnetic interaction between the drive body 600 and the coupled head.

In various implementations, the magnet holder 682 can comprise a rotating portion 685 and a static portion 685. The rotating portion 658 can be driven by a yaw control motor 677, which can receive yaw control commands for processing resources of the coupled head or the drive body 600. In one example, the rotating portion 658 can comprise an outer ring holding a number of magnets. The outer ring can circumscribe or surround an inner holder, which can comprise the static portion 685. The inner holder can include one or more magnets to attractively couple with one or more stationary magnets of the coupled head. Furthermore, the magnets of the rotating portion 658 can be either attractively coupled or repulsively coupled, or a combination of both, with corresponding rotating magnets within the coupled head.

FIGS. 7A and 7B illustrate example yaw control motor configurations implemented on a multi-body self-propelled device, as provided herein. Referring to FIG. 7A, the yaw control motor 707 can drive a rotating holder 705 of the magnet holder 700. In the example shown, the rotating holder 705, including a number of magnets, comprises an inner section of the magnet holder 700. A surrounding outer ring 701 can also include a number of magnets, and can be stationary with respect to the internal drive system and the magnet support assembly of the drive body. In one example, the stationary outer ring 701 can be rigidly affixed to a housing of the yaw control motor 707. The yaw control motor 707 can be operable to rotate the inner rotating holder 705, which in turn can rotate a corresponding inner rotating holder of the coupled head. In certain variations, the magnet holder 700 can further house the induction coil 703 for the upper induction interface of the drive body to receive power and/or data. In the example shown, the induction coil 703 is included between the outer ring 701 and the inner holder 705. However, alternative examples can include the induction coil outside the outer ring 701 (e.g., circumscribing the outer ring), or as a separate component external to the magnet holder 700. In variations, the induction coil 703 can be included the example shown in FIG. 7B, either between the rotating outer ring 711 and the inner stationary holder 715, surrounding the outer ring 711, or as a separate component to the magnet holder 710.

Referring to FIG. 7B, the outer ring 711 of the magnet holder 710 can be rotatably driven by the yaw control motor 717, and the inner holder 715 can be stationary with respect to the magnet support assembly and the internal drive system of the drive body. Thus, the magnets of the outer ring 711 can be magnetically coupled to corresponding magnets of an outer ring of the coupled head. When the outer ring 711 is driven by the yaw control motor 717, the corresponding outer ring of the coupled head is also rotated accordingly. The magnetic interaction between the rotating outer ring of the magnet holder 710 and the corresponding rotating outer ring of the coupled head can be repulsive, attractive, or a combination of both. As provided herein, the stationary inner holder can include one or more magnets to attractively couple with a corresponding set of one or more magnets on an inner stationary holder of the coupled head. As further provided herein, the yaw control motor 717 can execute yaw commands from the processing resources of the coupled head or the drive body to independently cause rotation of a housing portion of the coupled head.

Figure 8:
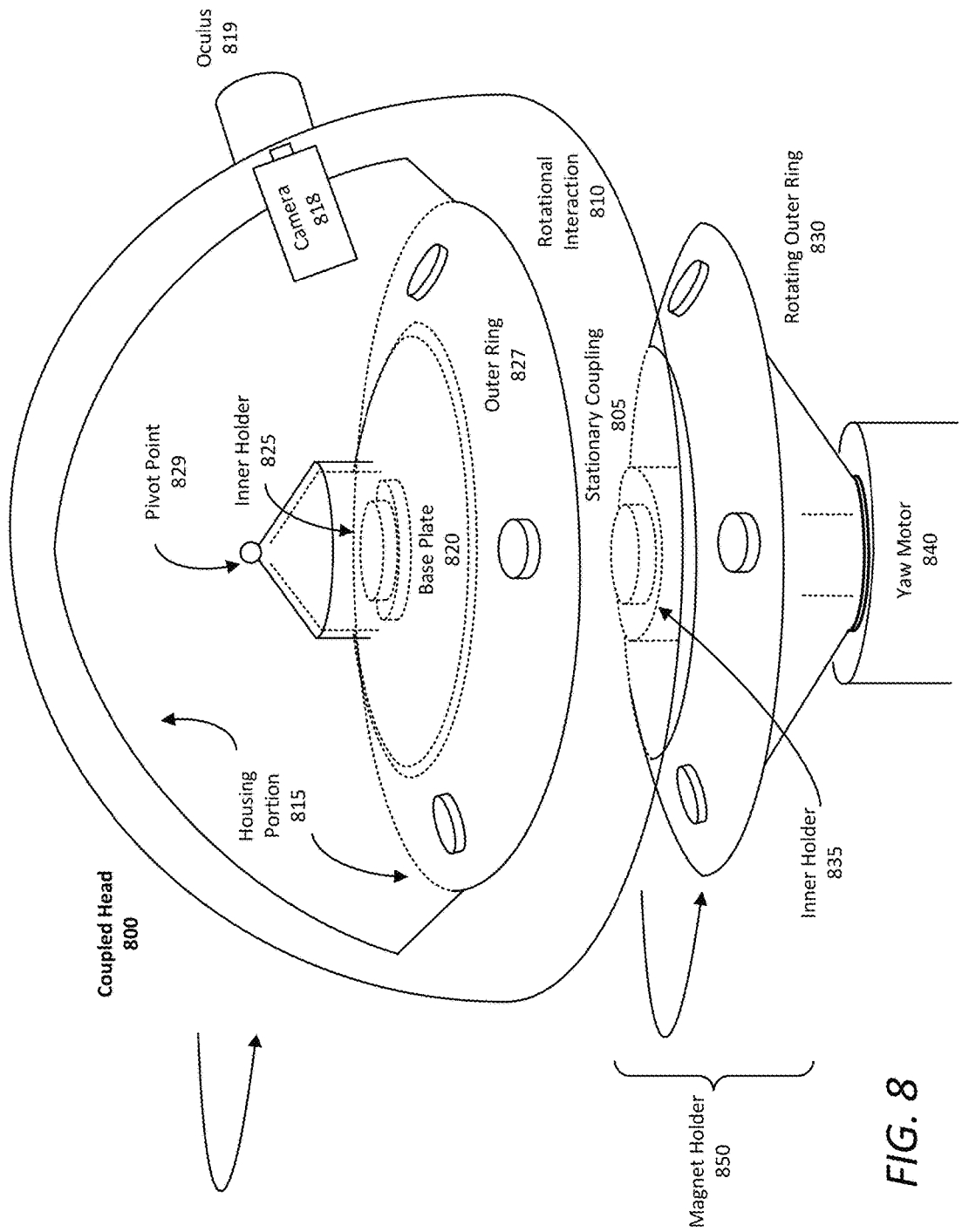
FIG. 8 illustrates an example magnetic interaction between a magnet support assembly of a drive body and a coupled head of a multi-body self-propelled device, as described herein.

FIG. 8 illustrates an example magnetic interaction between a magnet support assembly of a drive body and a coupled head of a multi-body self-propelled device, as described herein. As shown FIG. 8, the spherical housing of the drive body is excluded for purposes of simplicity. However, the magnetic interactions 805, 810 between the rotating and stationary portions showing in FIG. 8 respectively extend through the spherical housing. Furthermore, not shown are various electronic components of the coupled head 800, such as the induction interface, processing resources, sensors, wireless communications module, and the like. Referring to FIG. 8, the coupled head 800 can comprise a stationary base plate 820 holding one or more magnets and a rotating housing portion 815 including a number of magnets along an outer ring circumscribing the base plate 820. In the example shown in FIG. 8, the yaw motor 840 of the drive body operates to rotate a rotating outer ring 830 of the magnet holder 850 while the inner holder 835 remains stationary. However, alternative examples are contemplated in which the yaw motor 840 rotates the inner holder 835 with respect to the outer ring 830. In such alternatives, the inner holder 825 of the coupled head 800 can be rigid to the housing portion 815 (e.g., via a support column) to cause it to rotate in concert with the inner holder 835 being driven by the yaw motor 840. Thus, the outer magnets of the coupled head can be included on a ringed base plate that remains static in relation to the stationary magnets of the magnet holder 850.

Still referring to FIG. 8, as the yaw motor 840 executes yaw commands, the outer ring 830 is rotated. The rotational magnetic interaction 810 between the magnets on the outer ring 830 of the magnet holder 850 and the magnets on the outer ring 827 of the coupled head 800 can cause the housing portion 815 of the coupled head 850 to rotate in relation to the static base plate 820. As described herein, the inner holder 825 of the coupled head 850 and the inner holder 835 of the magnet holder 850 can include magnets that are attractively coupled (i.e., the stationary coupling 805 as shown). In the example shown in FIG. 8, each of the inner holders 125, 835 includes a single magnetic disc forming the stationary coupling 805. However, various other implementations are contemplated. For example, the magnets of the inner holders 825, 835 can comprise programmable magnets having asymmetrical fields, for example, to produce a clocking or compassing force that can situate the housing portion of the coupled head 800 in one or more default orientations (e.g., a forward operational direction). Thus, in some examples, to rotate the housing portion 815 to a default orientation, the yaw motor 840 can simply disengage or going into neutral, and the clocking force will automatically rotate the housing portion 815 to the default orientation. Such arrangements can be advantageous for coupled heads 800 having surface features indicating a default forward looking direction, such as an oculus 819 through which a camera 818 can record image data, or through which a projector can project an image or video recording.

In certain implementations, the magnets of the inner holders 825, 835 and the outer rings 827, 830 can be manufactured and/or arranged to substantially minimize flux density between inner and outer magnets. This can enable the yaw motor 840 to drive the rotating portion of the magnet holder 850 with minimal resistance. In certain implementations, the yaw motor 840 can be operated to turn the housing portion 815 of the coupled head 800 in order to point the camera 818 in selected directions to, for example, execute feature or facial recognition in connection with a particular mode of operation.

In some aspects, the inner holder 825 of the coupled head 800 can be rotatably coupled to the housing portion 815 by way of an axle, thruster bearing, or a pivot point 829 in which the base plate 820 and the housing portion 815 remain in contact. The pivot point 829 enables the outer housing portion 815—holding the outer magnets of the outer ring 827—to rotate in relation to the base plate 820 in accordance with the yaw motor 840 within the drive body. In various examples, the housing portion 815 can be dome shaped, and the base plate 820 can be formed to have a radius of curvature that is substantially or exactly the same as the radius of curvature of the spherical housing.

According to examples described herein, by having independently rotatable magnetic fields, one field can be coupled to the base plate 820 of the coupled head 800 and the other field can be coupled to the housing portion 815 (via the outer ring 827) of the coupled head 800 which allows the dome to rotate independently of the base plate 820. In various aspects, the size, shape, and intensity of the magnetic fields in use can be selected to allow for free rotation of the outer field without interference from the inner field inducing clocking locked position states. Additionally, the inner field may help to counter rotation by locking the rotational base down to avoid torsion.

In one implementation, a single magnetic node can be located in the inner field coupling the drive body and the coupled head 800 (as shown in FIG. 8). In this implementation, a friction between the coupled head 800 and the spherical housing of the drive body creates friction that resists torsion. The outer fields can be placed in any configuration that allows for motion of the outer field to induce rotation of the outer field. This includes assemblies for the outer field that induce motion through attraction, repulsion, or a combination of attraction and repulsion.

In variations, multiple magnetic nodes can be utilized in the center field to create a short and strong patterned field. In such variations, the inner field is able to resist rotation through a series of attracting nodes placed in close proximity to attracting fields in the opposite direction. This can induce repulsion if the field is rotated leading to axial and rotational positioning. For such variations, the outer field can be attracting, repulsing, or a combination of attraction and repulsion.

In further variations, a strong centrally located two node field can maintain the coupling between the coupled head 800 and the drive body to keep them aligned. The outer field can be generated via a series of smaller alternating nodes around the central node, and can baffle the inner magnetic field, reducing its intensity by the outer edge. In such variations, the outer field can be in attraction, repulsion, or a combination of attraction and repulsion. In still further variations, the inner field can contain two alternate directional nodes locking the position of the base plate 820 to the drive body with no field mitigation. In this variation, the yaw motor 840 can transfer motion from the drive body to the coupled head 800 through a patterned field that does not allow for any strong compassing forces to develop between the inner and outer field. Still further, as described herein, a complete inversion of the inner and outer fields is contemplated so that the inner field is rotated while the outer field is held stationary. This could be achieved by applying any of the techniques described above but switching the application of the fields between the inner and outer sections and rotating the inner field instead of the outer field.

Mechanical Yaw Control

Figure 9A:
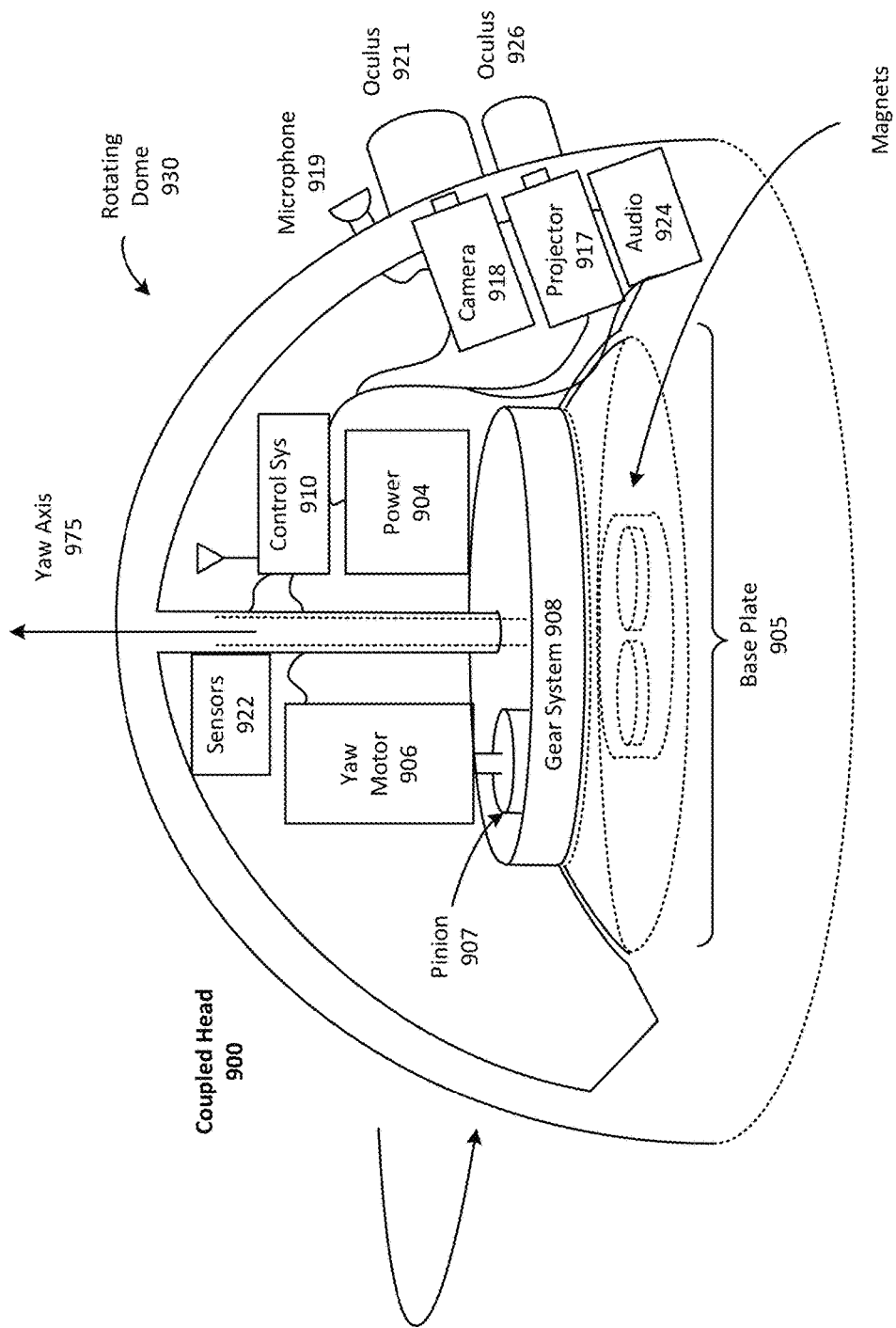

FIGS. 9A and 9B illustrate example yaw control implementations for a coupled head of a multi-body self-propelled device, according to examples described herein. Referring to FIG. 9A, the coupled head 900 can comprise a rotating dome 930 and a base plate 905. The arrangement of the coupled head 900 can enable the rotating dome 930 to rotate relative to the "fixed" base plate 905, which can be static to an underlying magnet holder within the drive body of the self-propelled device. Thus, the base plate 905 can house a number of magnets 907 which can enable the magnetic interaction with the corresponding magnets within the drive body. In the examples shown in FIGS. 9A and 9B, the yaw motor 906 can be included within the coupled head 900, and the drive body can include a stationary, non-rotating magnet holder affixed atop the internal drive system or biasing mechanism.

According to various implementations, the coupled head 900 can include various components described herein (e.g., with respect to FIGS. 1A and 1B), including sensors 922, a control system 910 (e.g., one or more processors, a program library, a communications system, etc.), a camera 918, a projector 917, an audio output device 924, and a microphone 919. In certain examples, the camera 918 can have a view field through a first oculus 921 of the rotating dome 930 and the projector 917 can project content through a second oculus 926 of the rotating dome 930. Various other components can be included within the coupled head 900 that are not shown, such as a charge port, an induction interface, and a local wireless communication interface, as described herein. Some of the components may be affixed to the outer rotating dome, such as the camera 918 and the projector 917. Other components may be rigid to the base plate 905, such as the power source 904, the control system 910, and the sensors 922. The outer housing shown in FIGS. 9A and 9B is in the form of a dome, but it is contemplated that the outer housing can be any shape or size, such as a cube, a cylindrical shape, or any other forms of regularly or irregularly shaped housing designs.

In many aspects, an output shaft of the yaw motor 906 can drive a pinion 907 that meshes with an internal ring gear of a gear system 908, which can be affixed to the base plate 905. Thus, when yaw commands are executed by the yaw motor 906, the driven pinion 907 can cause the rotating dome 930 to spin relative to the base plate 905. In another aspect, the yaw motor 906 can be further away from the yaw axis 975, and the pinion 907 can be meshed with an external ring gear (not shown). Thus, when executing yaw commands from the control system 910, the pinion 907 can drive the external ring gear, causing the dome 930 to rotate accordingly. In other variations, the gear system 908 can include one or more idler gears driven by the pinion 907 and meshed with an internal ring gear of the gear system 908. In such a variation, the yaw motor 906 can be more centrally located within the rotating dome 930 to increase rotational stability.

Referring to FIG. 9B, the yaw motor 906 can be coaxial with the yaw axis 975, and directly drive an axle to rotate the rotating dome 930 relative to the base plate 905. In this direct mount example, the gear system 908 may be excluded. Several other examples are contemplated, such as a gear system 908 including worm gears, bevels gears, and/or belts or chains.

Independent Pitch Control

Figure 10A:
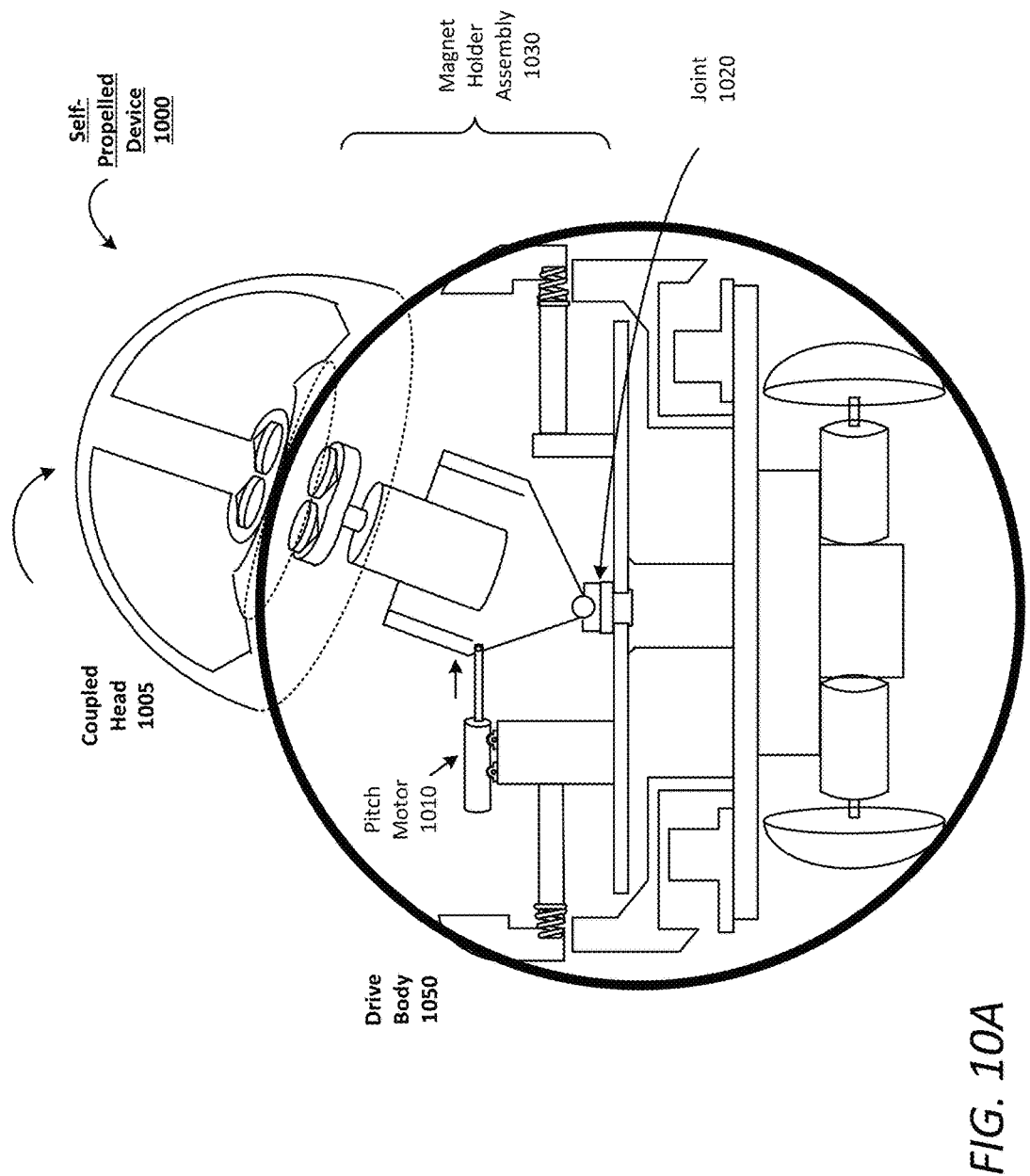
FIG. 10A is a schematic diagram of an example self-propelled device including independent pitch control for a coupled head, according to examples described herein.

FIG. 10A is a schematic diagram of an example self-propelled device including independent pitch control for a coupled head, according to examples described herein. The multi-body self-propelled device shown in FIG. 10A can include any of the features of multi-body self-propelled devices described herein, such as induction interfaces, complementary magnet holders with stationary and rotatable portions, a yaw control motor (either in the coupled head 1005 for mechanical yaw control, or in the drive body 1050 for magnetic yaw control), an internal drive system, a magnet support assembly, a biasing mechanism, and the like. Referring to FIG. 10A, the drive body 1030 can include magnet holder assembly 1030 coupled by a joint 1020 to a floor or other connection point of the internal chassis of the self-propelled device 1000. The floor can comprise the roof of the internal drive system, a carrier component of the magnet support assembly. The magnet holder assembly 1030 can be rotationally pitched by a pitch motor 1010 included within the drive body 1050. The pitch motor 1010 can comprise a linear motor or other type of actuator, or a rotary motor or other type of servo. Furthermore, the joint 1020 can comprise a hinge joint for single axis pitch, or a multi-axis joint, such as a universal joint or a ball joint.

In single axis implementations, a single pitch motor 1010 can be included to tilt the magnet holder assembly 1030 on a hinge joint 1020 along a single tilt axis independent of the internal drive system. Control commands executable by the pitch motor can be received from an external controller device, or can be generated locally by the self-propelled device 1000 (e.g., in an autonomous mode). Furthermore, the pitch motor 1010 can be actuated independently of and in conjunction with the yaw control motor to enable both independent pitch and yaw control of the magnet holder assembly, which can give the coupled head 1005 the effect of nodding, looking around, or other expressive actions.

In multi-axis implementations, a second pitch motor (not shown) can be included and can be rigidly coupled to the internal chassis. The second pitch motor and the first pitch motor can be executed in concert to pitch and tilt the magnet holder assembly 1030 on a multi-axis joint 1020 such that the coupled head 1005 can be caused to pitch and tilt atop the drive body 1050 independently of the internal drive system. Thus, the pitch motors can each execute pitch commands to pitch and tilt the coupled head 1005 atop the drive body 1050, and the yaw control motor can execute yaw commands to rotate the coupled head 1005 (or a rotatable housing portion of the coupled head 1005) accordingly.

FIGS. 10B and 10C are top views of example self-propelled devices having single axis and multi-axis independent pitch control for a coupled head, according to examples described herein. FIG. 10B shows an example single axis implementation that can include a single or multiple pitch control motors 1072 that control the pitch of the magnet holder assembly 1074 in an arc on a single pitch axis 1070 via a hinge joint. In the example shown in FIG. 10B, the magnet holder assembly 1074 is driven by a single pitch motor 1072 that can execute pitch commands received by an external controller device, or generated locally on the coupled head or drive body. The pitch motor 1072 can comprise a linear motor that drives the magnet holder assembly 1074 via, for example, an arm attachment coupled to a support structure of the magnet holder assembly 1074. Other variations can include a direct drive on the hinge joint, or different motor type (e.g., a rotary servo)

Referring to FIG. 10B, the magnet holder assembly 1084 can be pitched along two combined pitch axes 1080 by way of multiple pitch motors 1082 (e.g., one pitch motor per orthogonal axis). In this manner, the magnet holder assembly 1084 can be tilted and pitched atop the drive body in any direction, and rotationally about the yaw axis, through combined execution of pitch commands by the pitch motors 1082. The pitch motors 1082 can each be coupled to the magnet holder assembly 1084 via a combination of hinges and/or joints to enable the independent pitch control about the combination pitch axes 1080.

Figure 11A:
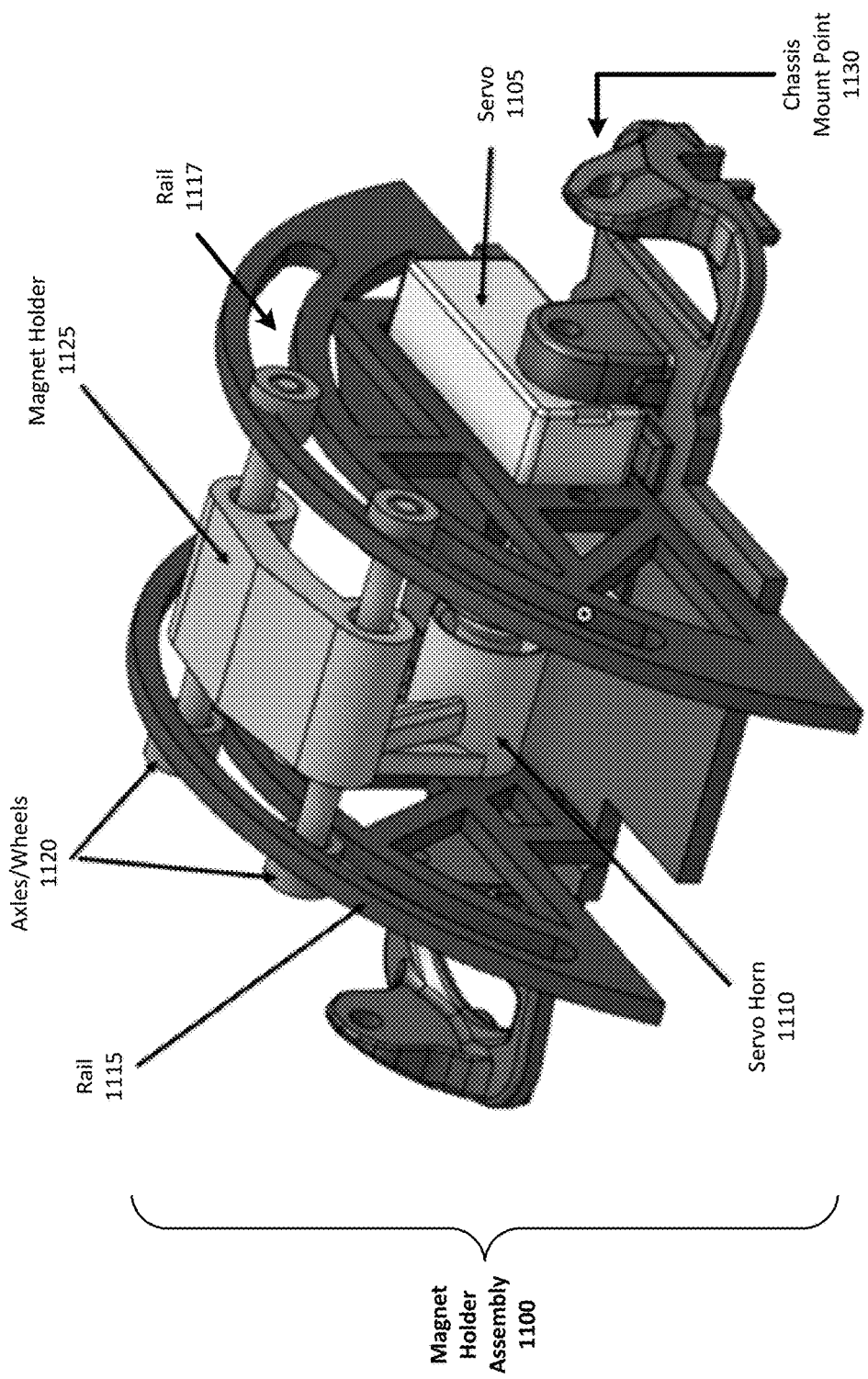
FIGS. 11A and 11B depict example magnet holder assemblies including a rail system for independent pitch control for a coupled head, according to examples described herein.
Figure 11B:
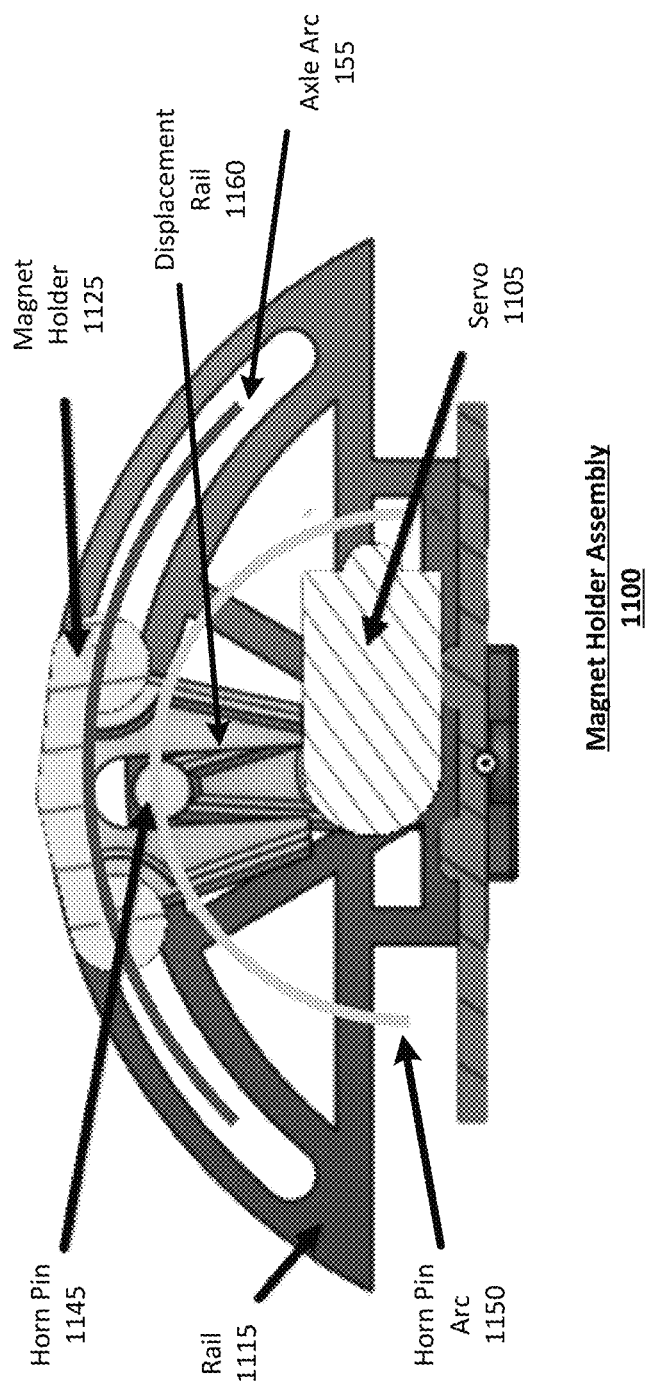

FIGS. 11A and 11B depict example magnet holder assemblies including a rail system for independent pitch control for a coupled head, according to examples described herein. The example magnet holder assembly 1100 shown in FIG. 11A can be mounted to an internal chassis of the example multi-body self-propelled devices described herein. For example, the magnet holder assembly 1100 can be mounted to a top portion of the magnet support assembly 558 as shown and described with respect to FIG. 5. The magnet holder assembly 1100 can be mounted to the internal chassis via a number of chassis mount points 1130. Furthermore, the magnet holder 1125 shown in FIG. 11A, can support a number of magnets (e.g., a pair of oppositely oriented magnets), and can further include a mount for a yaw control motor to enable independent yaw control of the coupled head (not shown).

In several implementations, the magnet holder assembly 1100 can include an arced rail system comprising a pair of arced rails 1115, 1117. The magnet holder 1125 can include one or more conduits through which axle and wheel assemblies 1120 may pass through to enable the magnet holder 1125 to traverse the arced rails 1115, 1117. According to examples provided, the arced rails 1115, 1117 can have a radius of curvature and can be mounted within the spherical housing of the drive body such that the center of its radius of curvature is concurrent with the center of the spherical housing. The magnet holder 1125 can be driven along the arced rails 1115, 1117 by a servo or rotary motor 1105, which can drive a servo horn 1110 that couples the servo 1105 to the magnet holder 1125. Thus, the servo 1105 can execute pitch control commands generated from an external controller device or generated locally by the coupled head and/or drive body of the self-propelled device, as described herein.

Actuation of the servo 1105 can cause the servo horn 1110 to rotate, which can cause the magnet holder 1125 to traverse along the arced rails 1115, 1117 accordingly. While the example shown in FIG. 11A includes a passive axle/wheel assembly, it is contemplated in variations that the magnet holder assembly 1100 can include a direct drive system that directly provides torque to the axles and wheels 1120 to drive the magnet holder 1125 along the rails 1115, 1117. Further variations can include a single rail and axle system, or a combination of multiple rails, axles, and/or wheels.

FIG. 11B shows a side view of the magnet holder assembly shown in FIG. 11A. In certain implementations, the servo horn 1100 can include a horn pin 1145 that is driven by the servo 1105 to cause the magnet holder 1125 to traverse the rail 1115. Accordingly, magnets situated atop the magnet holder 1125 can be magnetically coupled to corresponding magnets within the coupled head, thus causing the coupled head to traverse over the outer surface of the drive body. As shown in FIG. 11B, the servo 1105 can drive the horn pin 1145 along a horn pin arc 1150 having a radius of curvature that is significantly smaller than the radius of curvature of the arced rail 1115 (i.e., the axle arc 1155). To compensate for the differential, the horn pin 1145 can couple to the magnet holder 1125 by way of a displacement rail 1160 in which the horn pin 1145 traverses as the servo motor 1105 is actuated. This enables the servo 1105 to be significantly closer to the inner wall of the spherical housing, and also allows the magnet holder 1125 to maintain a constant distance from the inner wall, thus providing constant magnetic flux density as the magnet holder 1125 traverses the arced rails 1115, 1117.

Controller Device

Figure 12:
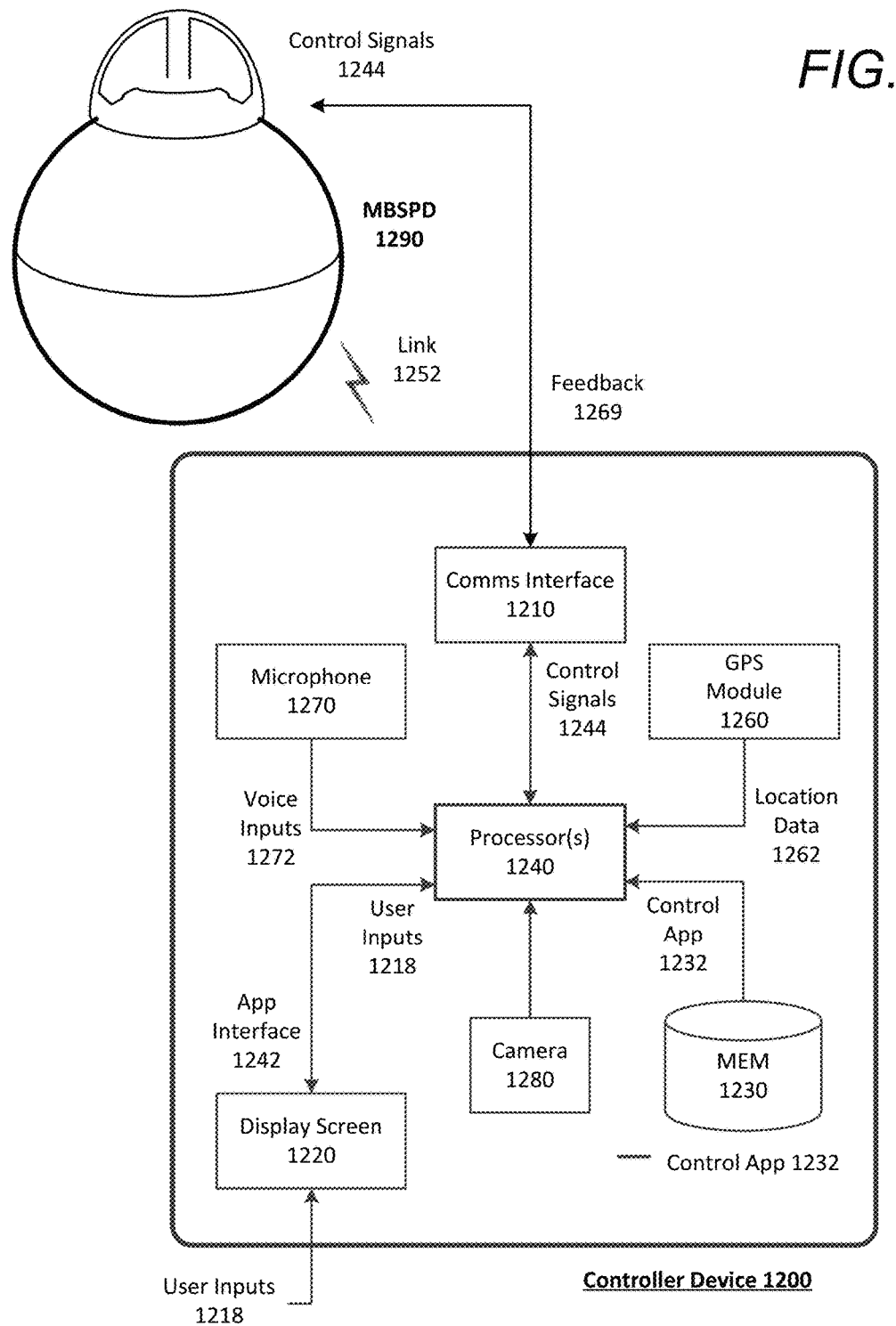
FIG. 12 is a block diagram illustrating an example controller device for utilization with multi-body self-propelled devices described herein.

FIG. 12 is a block diagram illustrating an example controller device for utilization with multi-body self-propelled devices described herein. In several examples, the controller device 1200 includes processing resources 1240 and one or more memory resources 1230, such as a main memory, ROM, and a storage device. The controller device 1200 can further include a communication interface 1210. The at least one processor 1240 can process data received via the communications interface 1210 or various components of the controller device 1200 in accordance with an executing software application, such as a control application 1232 specific to operating the multi-body self-propelled device 1290. The memory 1230 can include a main memory, such as a random access memory (RAM) or other dynamic storage device, for storing information and instructions to be executed by the processor 1210 (e.g., a control application 1232). The instructions can, for example, enable interpretation of input on the controller device 1200, such as voice inputs 1272 into a microphone, or user inputs 1218 on a display screen 1220 of the controller device 1200. For example, in executing the control application 1232, the processor 1240 can generate an application interface 1242 on the display screen 1220, which can enable a user to provide user inputs 1218 that can be processed by the processor 1240 to generate control signals 1244 for execution by the self-propelled device 1290.

The memory 1230 also may be used for storing temporary variables or other intermediate information during execution of instructions to be executed by the processor 1240. The controller device 1200 may also include a read only memory (ROM) or other static storage device for storing static information and instructions for the processor 1240. A storage device, such as a memory card or mini flash drive, can be provided for storing information and instructions. For example, the storage device can correspond to a computer-readable medium that triggers logic for maneuvering the self-propelled device 1290 discussed with respect to FIGS. 1-9B.

The communication interface 1210 can enable the controller device 1200 to communicate with the self-propelled device 1290 via an established network link 1252. Using the network link 1252, the controller device 1200 can transmit the control signals 1244 and receive feedback 1269 from the self-propelled device 1290. The controller device 1200 can further include a GPS module 1260 to provide the processor 1240 with location data 1262. The location data 1262 can be utilized in connection with the self-propelled device 1290 based on task-oriented or service-oriented functions of the control application 1232 (e.g., gameplay or educational-based services). The controller device 1200 can further include output devices such as haptic and audio systems that enable the processor 1240 to provide haptic and audio responses. In further examples, the controller device 1200 can also include an IMU to generate sensor data, which can also be utilized to generate the control signals 1244 to be processed by the self-propelled device 1290. In further examples, the controller device 1200 can also include a camera 1280 to provide or record image data in connection with the executed control application 1232.

Examples described herein are related to the use of the controller device 1200 to enable user interaction with the multi-body self-propelled device 1290 as described herein. According to one example as illustrated in FIG. 12, certain techniques are performed by the controller device 1200 in response to the processor 1240 executing one or more sequences of one or more instructions contained in the memory 1230. Such instructions may be read into the memory 1230 from another machine-readable medium, such as a storage device. Execution of the sequences of instructions contained in the memory 1230 causes the processor 1240 to perform certain process steps described herein. In certain examples, the memory 1230 can store multiple applications each specific to a particular use of the multi-body self-propelled device 1290. For example, a specified application can be executed by the process 1240 to generate a unique application interface 1242 to control or interact with the self-propelled device 1290 in a specified mode, selected from multiple modes of operation. Additionally or alternatively, multiple modes of the self-propelled device 1290 can be executed via a single control application 1232 based on user inputs 1218 or voice inputs 1272 on the controller device 1200. In alternative implementations, hard-wired circuitry may be used in place of or in combination with software instructions to implement examples described herein. Thus, the examples described are not limited to any specific combination of hardware circuitry and software.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A multi-body self-propelled device comprising:
   (i) a drive body comprising:
      a spherical housing;

an internal drive system within the spherical housing to propel the multi-body self-propelled device;
a magnet holder coupled to the internal drive system to hold a first set of magnetic elements;
a first power source within the spherical housing to power the internal drive system;
a first inductive interface; and
(ii) a coupled head comprising:
second set of magnetic elements to establish a magnetic interaction with the first set of magnetic elements through the spherical housing;
a second power source; and
a second inductive interface;
wherein the multi-body self-propelled device transfers power between the coupled head and the drive body via the first and the second inductive interfaces.

2. The multi-body self-propelled device of claim 1, wherein the first and the second inductive interfaces each comprises a number of coils to transfer both power and data between the coupled head and the driving body.

3. The multi-body self-propelled device of claim 1, wherein the coupled head further comprises (i) a wireless communications interface to receive control signals from a controller device, and (ii) one or more processors to interpret the control signals as control commands to operate the multi-body self-propelled device.

4. The multi-body self-propelled device of claim 3, wherein the coupled head further comprises a local wireless interface to establish a local data link with the drive body via a corresponding local wireless interface within the housing.

5. The multi-body self-propelled device of claim 4, wherein the control commands comprise locomotion commands to be executed on the internal drive system to accelerate and maneuver the multi-body self-propelled device, and wherein the one or more processors of the coupled head transmit the locomotion commands to the internal drive system via the local data link.

6. The multi-body self-propelled device of claim 3, wherein the coupled head further comprises an audio output device and a microphone to receive voice commands from a user, and wherein the one or more processors further translate the voice commands to operate the multi-body self-propelled device in at least a partially autonomous mode.

7. The multi-body self-propelled device of claim 3, wherein the coupled head further comprises a camera to record image data, and wherein the one or more processors transmit the image data to the controller device via the wireless communications interface.

8. The multi-body self-propelled device of claim 1, wherein the coupled head further comprises a charge port to receive power from an external power source.

9. The multi-body self-propelled device of claim 8, wherein the received power from the external power source charges the second power source, and wherein the received power from the external power source is further transferred to the drive body to charge the first power source via the first and the second inductive interfaces.

10. The multi-body self-propelled device of claim 8, wherein the charge port comprises one of a universal serial bus (USB) or a mini-USB port.

11. The multi-body self-propelled device of claim 1, wherein the drive body further comprises a third inductive interface to receive power from an external inductive charge port in order to charge the first power source.

12. The multi-body self-propelled device of claim 11, wherein the drive body transfers power, received from the external inductive charge port, to the second power source of the coupled head via the first and the second inductive interfaces.

13. The multi-body self-propelled device of claim 1, wherein the internal drive system comprises a pair of wheels powered by a pair of independent motors.

14. The multi-body self-propelled device of claim 13, wherein the drive body further comprises a biasing mechanism coupled to the internal drive system, the biasing mechanism providing a continuous force against an inner surface of the spherical housing, causing the pair of wheels to continuously engage the inner surface in order to accelerate and maneuver the multi-body self-propelled device.

15. The multi-body self-propelled device of claim 1, wherein the drive body further comprises (i) a capacitive sensor on an outer surface of the spherical housing, and (ii) one or more processors to detect a touch input on the capacitive sensor and, in response to the touch input, transition from a sleep mode by initiating a predetermined set of actions on the multi-body self-propelled device.

* * * * *